(12) United States Patent
Jung et al.

(10) Patent No.: US 9,846,342 B2
(45) Date of Patent: Dec. 19, 2017

(54) LIQUID CRYSTAL DISPLAY DEVICE

(71) Applicant: Samsung Display Co., Ltd., Yongin, Gyeonggi-Do (KR)

(72) Inventors: Jae Hoon Jung, Anyang-si (KR); Ki Chul Shin, Seongnam-si (KR); Dan Bi Yang, Gunpo-si (KR); Min Joo Han, Seoul (KR); Ji Phyo Hong, Pyeongtaek-si (KR)

(73) Assignee: Samsung Display Co., Ltd. (KR)

( * ) Notice: Subject to any disclaimer, the term of this patent is extended or adjusted under 35 U.S.C. 154(b) by 55 days.

(21) Appl. No.: 14/639,845

(22) Filed: Mar. 5, 2015

(65) Prior Publication Data

US 2016/0116809 A1    Apr. 28, 2016

(30) Foreign Application Priority Data

Oct. 23, 2014   (KR) .................. 10-2014-0144350

(51) Int. Cl.
   *G02F 1/1343*   (2006.01)
   *G02F 1/1362*   (2006.01)
   *G02F 1/139*    (2006.01)

(52) U.S. Cl.
   CPC .. *G02F 1/136286* (2013.01); *G02F 1/134309* (2013.01); *G02F 1/1393* (2013.01);
   (Continued)

(58) Field of Classification Search
   CPC ......... G02F 1/134335; G02F 1/133345; G02F 1/13439; G02F 1/136209; G02F 1/1368;
   (Continued)

(56) References Cited

U.S. PATENT DOCUMENTS 8,421,986 B2    4/2013  Chen et al.
2011/0157537 A1*  6/2011  Chen ................ G02F 1/133707
                                           349/158
(Continued)

FOREIGN PATENT DOCUMENTS

KR    1020110101894 A    9/2011
KR    1020120120761 A    11/2012
(Continued)

*Primary Examiner* — Michael Caley
*Assistant Examiner* — Angela Davison
(74) *Attorney, Agent, or Firm* — Innovation Counsel LLP

(57) ABSTRACT

A liquid crystal display includes: a first substrate; a gate line and a data line disposed on the first substrate; a thin film transistor connected to the gate line and the data line; a pixel electrode positioned on the first substrate, connected to the thin film transistor, configured to be applied with a first voltage, and including a first sub-pixel electrode including a first sub-region and a second sub-region and a second sub-pixel electrode configured to be applied with a second voltage; a protrusion electrode protruding from the pixel electrode to overlap the data line; and an insulating layer positioned on the first sub-region of the first sub-pixel electrode and positioned under the second sub-pixel electrode and the second sub-region of the first sub-pixel electrode, wherein the first sub-region of the first sub-pixel electrode overlaps the second sub-pixel electrode.

20 Claims, 20 Drawing Sheets

(52) U.S. Cl.
CPC ............ *G02F 2001/134345* (2013.01); *G02F 2201/123* (2013.01); *G02F 2201/124* (2013.01)

(58) Field of Classification Search
CPC ......... G02F 2201/123; G02F 1/134336; G02F 1/134309; G02F 2001/134345; G02F 2201/124
USPC ................................ 349/139, 143, 144, 147
See application file for complete search history.

(56) References Cited

U.S. PATENT DOCUMENTS

| | | | | |
|---|---|---|---|---|
| 2011/0261307 | A1* | 10/2011 | Shin .................. | G02F 1/133753 349/123 |
| 2012/0086687 | A1* | 4/2012 | Tsubata ................ | G09G 3/3659 345/209 |

FOREIGN PATENT DOCUMENTS

| | | |
|---|---|---|
| KR | 1020140097905 A | 8/2014 |
| KR | 1020150048316 | 5/2015 |

\* cited by examiner

LIQUID CRYSTAL DISPLAY DEVICE

CROSS-REFERENCE TO RELATED APPLICATION

This application claims priority to and the benefit of Korean Patent Application. No. 10-2014-0144350 filed in the Korean Intellectual Property Office on Oct. 23, 2014, the entire contents of which are incorporated herein by reference.

BACKGROUND (a) Technical Field

The present application relates to a liquid crystal display.

(b) Description of the Related Art

A liquid crystal display as one of flat panel display devices that are widely used includes two display panels where field generating electrodes such as a pixel electrode and a common electrode are formed and a liquid crystal layer interposed therebetween.

The liquid crystal display generates an electric field in the liquid crystal layer by applying voltages to the field generating electrodes, to determine orientations of liquid crystal molecules of the liquid crystal layer and control polarization of incident light, thereby displaying an image.

The liquid crystal display also includes a switching element connected to each pixel electrode, and a plurality of signal lines such as gate lines and data lines for applying voltages to the pixel electrodes by controlling the switching elements.

Among these LCDs, a vertical alignment mode LCD, which arranges major axes of liquid crystal molecules so as to be perpendicular to the display panel in a state in which an electric field is not applied, has been widely used due to its high contrast ratio and wide reference viewing angle. Here, the reference viewing angle implies a viewing angle that is 1:10 in contrast ratio, or a critical angle of gray-to-gray luminance reversion.

In order to approximate side visibility to front visibility in the vertical alignment mode LCD, a method of causing a difference in transmittance by dividing one pixel into two subpixels and applying different voltages to the two subpixels has been suggested.

On the other hand, recently, as the display device is large-sized and has a high resolution, the size of each pixel is decreased, and accordingly a weak portion to control the liquid crystal molecules is generated in an edge portion of the pixel.

The above information disclosed in this Background section is only for enhancement of understanding of the background and therefore it may contain information that does not form the prior art that is already known in this country to a person of ordinary skill in the art.

SUMMARY

An embodiment provides a liquid crystal display compensating a weak portion to control the liquid crystal molecules.

A liquid crystal display according to an exemplary embodiment includes: a first substrate; a gate line and a data line disposed on the first substrate; a thin film transistor connected to the gate line and the data line; a pixel electrode positioned on the first substrate, connected to the thin film transistor, configured to be applied with a first voltage, and including a first sub-pixel electrode including a first sub-region and a second sub-region and a second sub-pixel electrode configured to be applied with a second voltage; a protrusion electrode protruding from the pixel electrode to overlap the data line; an insulating layer positioned on the first sub-region of the first sub-pixel electrode and positioned under the second sub-pixel electrode and the second sub-region of the first sub-pixel electrode; a second substrate facing the first substrate; a common electrode positioned on the second substrate and configured to be applied with a common voltage; and a liquid crystal layer positioned between first substrate and the second substrate, wherein the first sub-region of the first sub-pixel electrode overlaps the second sub-pixel electrode.

A difference between the first voltage and the common voltage may be larger than a difference between the second voltage and the common voltage.

The protrusion electrode may protrude from the first sub-region of the first sub-pixel electrode.

The protrusion electrode may be formed with a trapezoid shape.

The protrusion electrode may include a first protrusion electrode protruding from the first sub-region of the first sub-pixel electrode and a second protrusion electrode protruding from the second sub-pixel electrode.

The protrusion electrode may protrude from the second sub-pixel electrode.

The liquid crystal display according to an exemplary embodiment may further include a light blocking member overlapping the gate line, the data line, and the protrusion electrode.

The light blocking member may be disposed on the first substrate or the second substrate.

The pixel electrode may be formed as a quadrangle, the second sub-region of the first sub-pixel electrode may be positioned at a center of the pixel electrode and be entirely formed with a rhombus shape outline with cutout sections, the first sub-region of the first sub-pixel electrode may include a plate electrode part of a hexagon shape with two triangle shapes cutout in a center of the hexagon shape enclosing the second sub-region and a bar electrode part overlapping the second sub-region and connected to the plate electrode part, and the second sub-pixel electrode may be entirely formed with four trapezoid shapes enclosing the second sub-region of the first sub-pixel electrode.

The protrusion electrode may protrude from the first sub-region of the first sub-pixel electrode.

The protrusion electrode may be formed with a trapezoid shape having an upper edge and a lower edge parallel to the data line and an oblique edge extending on a same line as one edge of the first sub-region of the first sub-pixel electrode.

The protrusion electrode may be formed with a trapezoid shape having an upper edge and a lower edge parallel to the data line and an oblique edge extending to be inclined from one edge of the first sub-region of the first sub-pixel electrode.

A length of the upper edge may be the same as the width of the bar electrode part.

The protrusion electrode may include a first protrusion electrode protruding from the first sub-region of the first sub-pixel electrode and a second protrusion electrode protruding from the second sub-pixel electrode.

The first protrusion electrode and the second protrusion electrode may overlap each other.

The first protrusion electrode may be formed as a polygon including two edges parallel to the data line and an edge extending on the same line as one edge of the first sub-region of the first sub-pixel electrode.

The second sub-pixel electrode may include an outer electrode positioned at an edge of the pixel electrode and branch electrodes extending in different directions from the outer electrode, and the second protrusion electrode may extend on a same line as the branch electrodes.

The protrusion electrode may protrude from the second sub-pixel electrode.

The second sub-pixel electrode may include an outer electrode positioned at an edge of the pixel electrode and branch electrodes extending in the different directions from the outer electrode, and the protrusion electrode may be symmetrical to a slit positioned between the branch electrodes.

The protrusion electrode may be formed with a trapezoid shape including an upper edge and a lower edge parallel to the data line and an oblique edge extending on a same line as one edge of the first sub-region of the first sub-pixel electrode.

The above-described liquid crystal display according to an exemplary embodiment has effects as follows.

The liquid crystal display according to an exemplary embodiment includes the protrusion electrode protruding from the edge of the pixel electrode, thereby smoothing the control of the liquid crystal molecules at the edge of the pixel electrode.

DETAILED DESCRIPTION OF THE EMBODIMENTS

Figure 1:
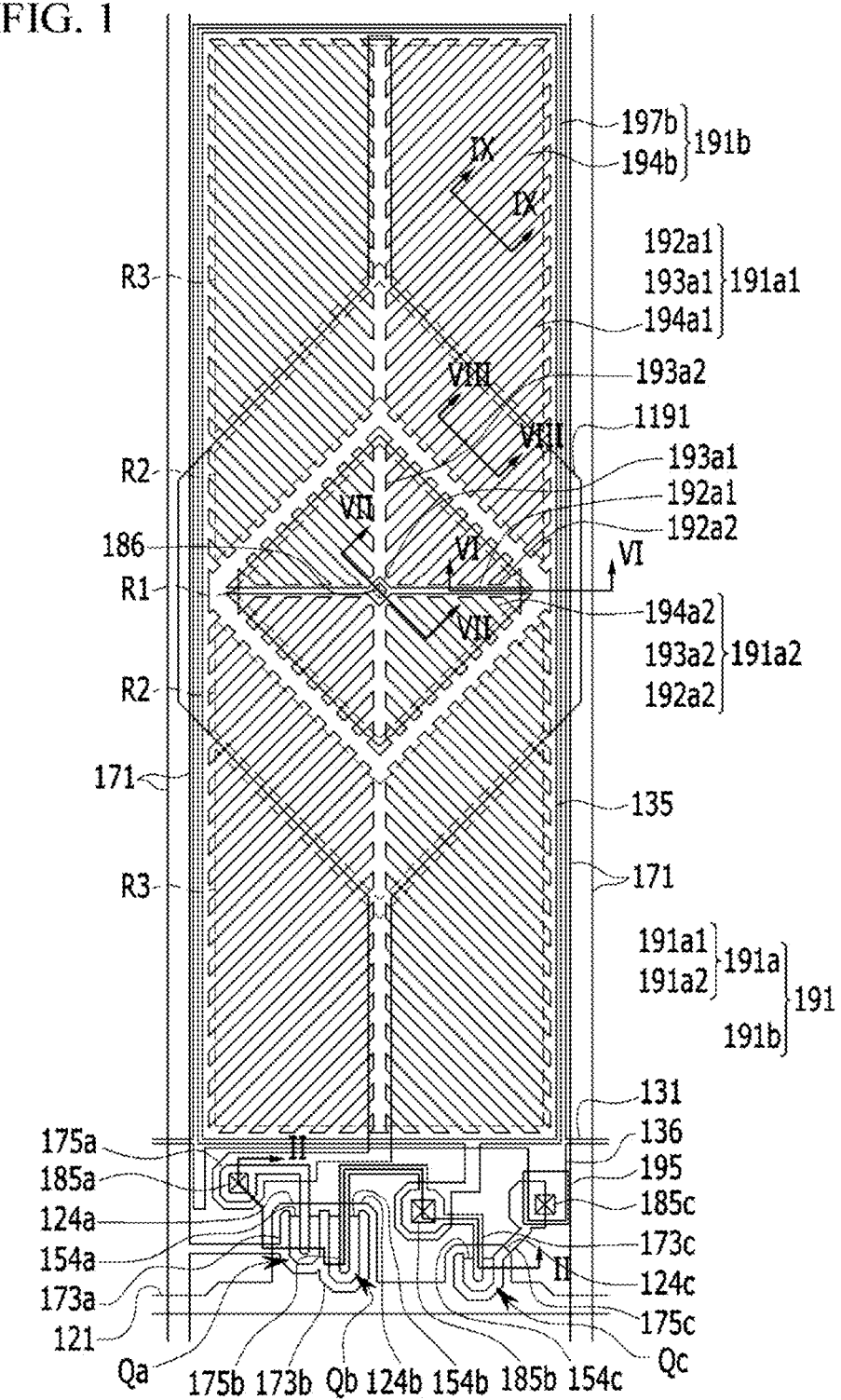
FIG. 1 is a layout view of a liquid crystal display according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a liquid crystal display according to an exemplary embodiment will be described with reference to FIG. 1 to FIG. 9.

Figure 2:
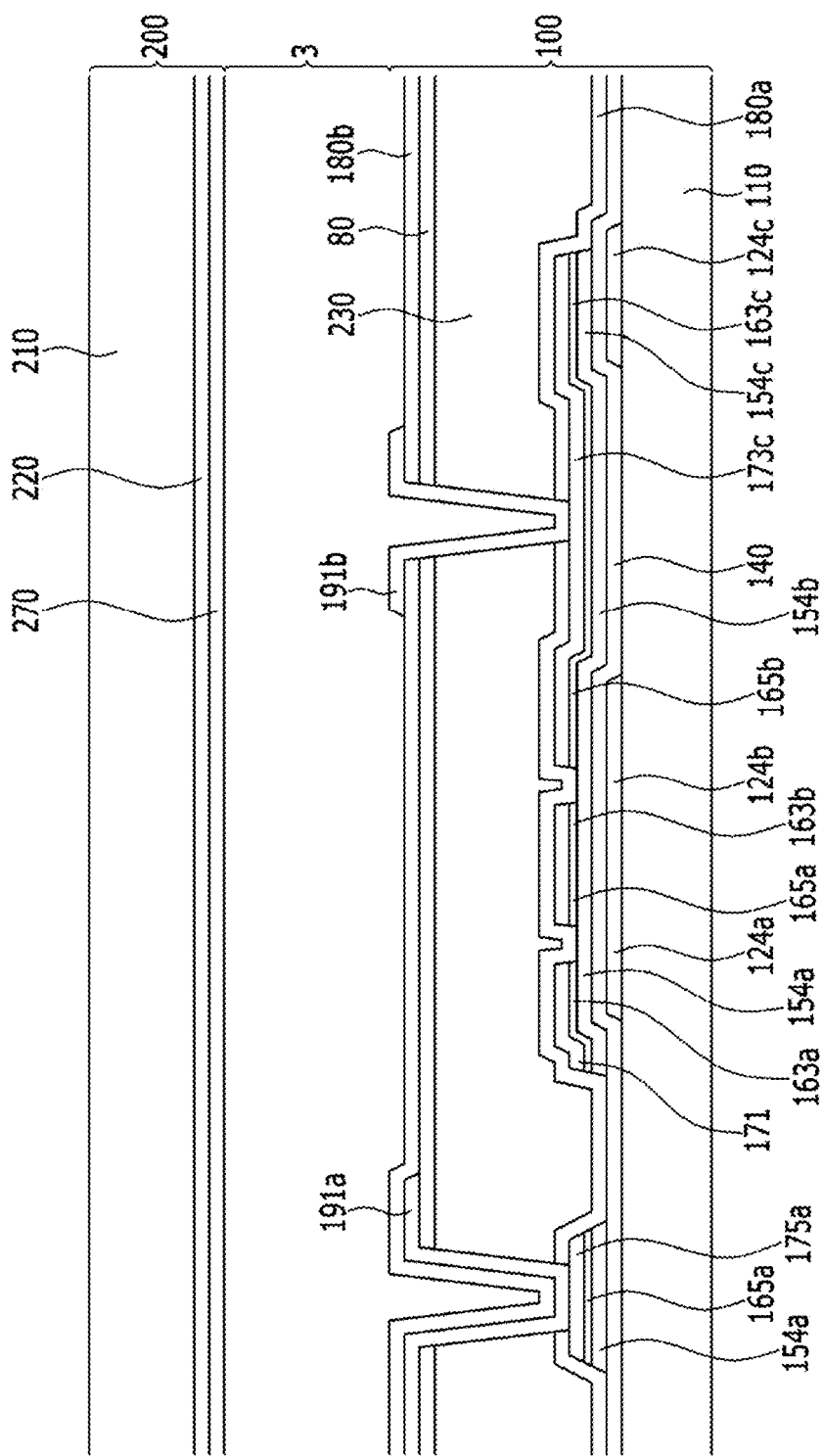
FIG. 2 is a cross-sectional view of the liquid crystal display of FIG. 1 taken along a line II-II.
Figure 3:
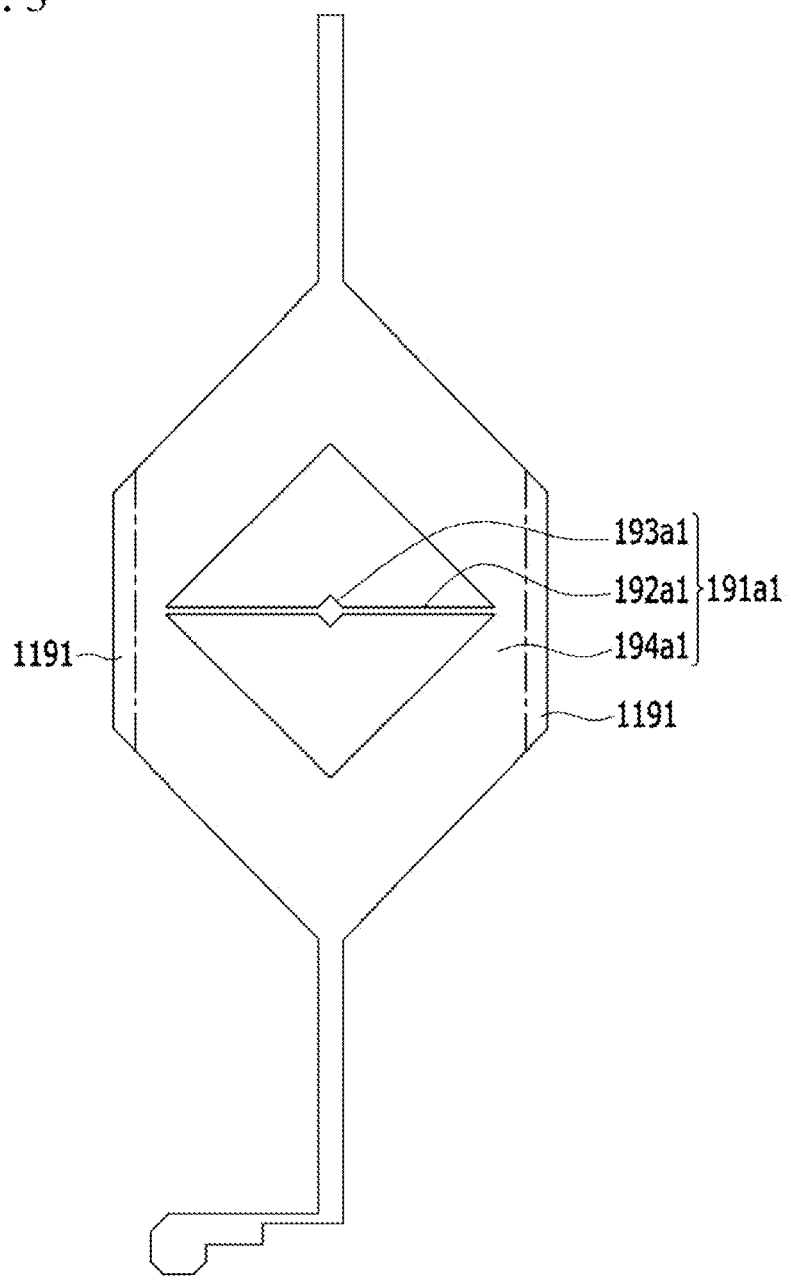
FIG. 3 is a partial layout view of a first sub-pixel electrode of the liquid crystal display shown in FIG. 1.
Figure 4:
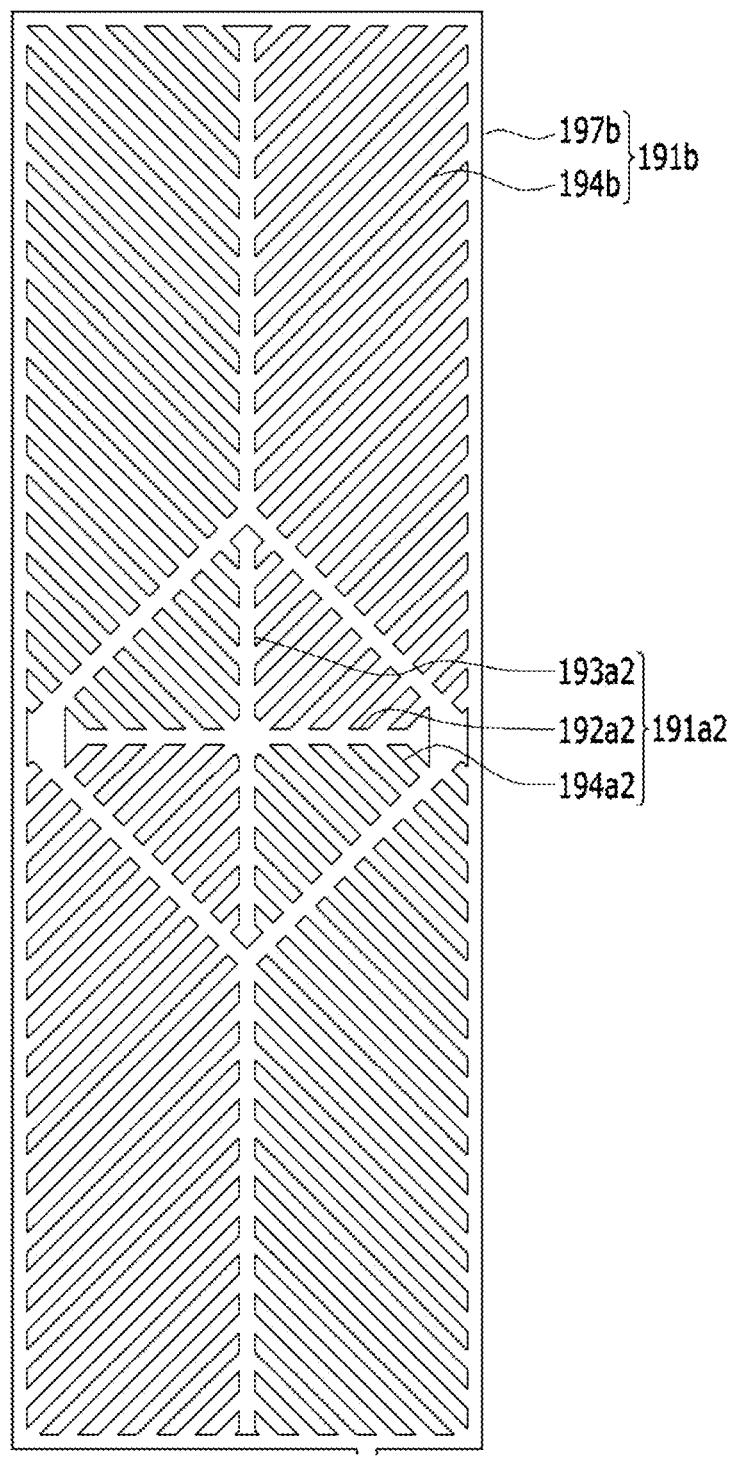
FIG. 4 is a layout view of another portion of a first sub-pixel electrode and a second sub-pixel electrode of the liquid crystal display shown in FIG. 1.
Figure 5:
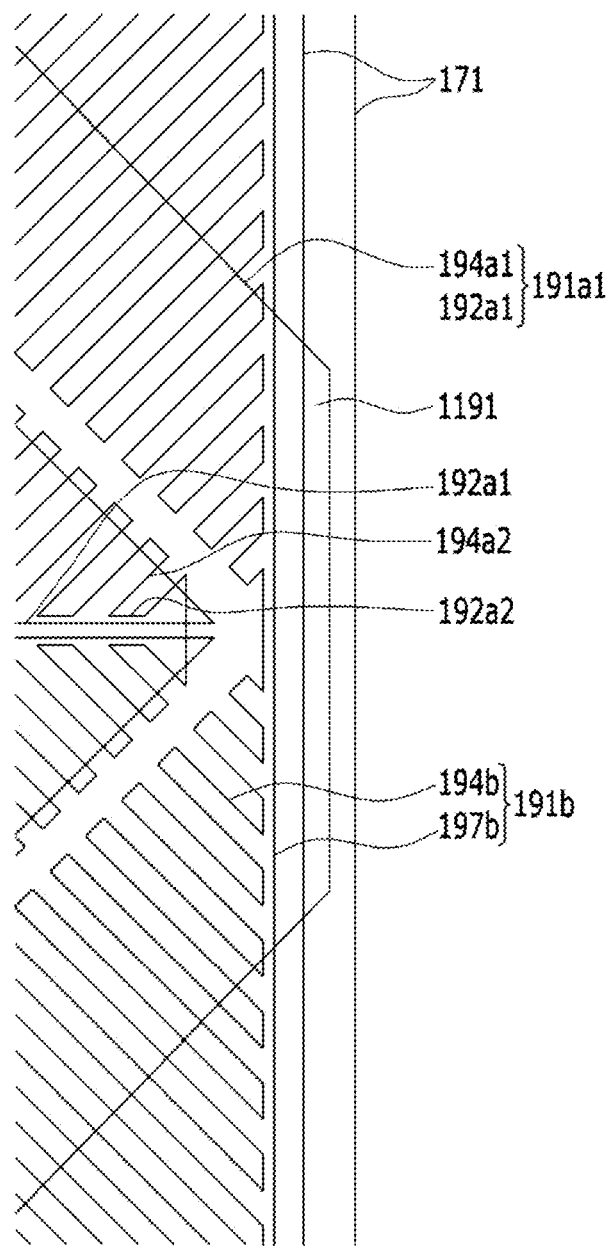
FIG. 5 is an enlarged layout view of a partial region of FIG. 1.
Figure 6:
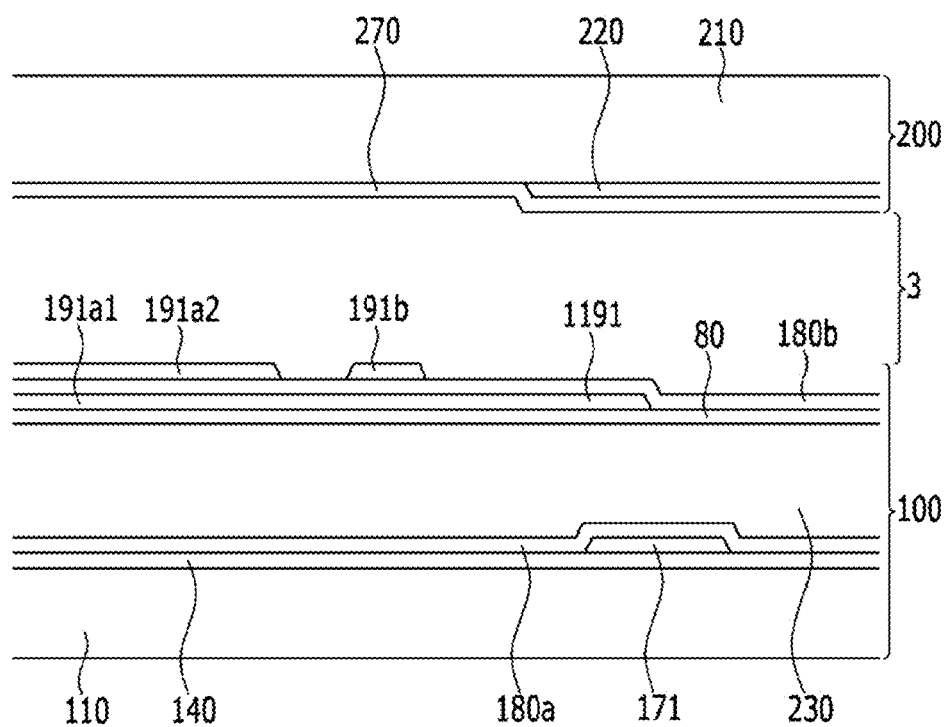
FIG. 6 is a cross-sectional view taken along a line VI-VI of FIG. 1.
Figure 7:
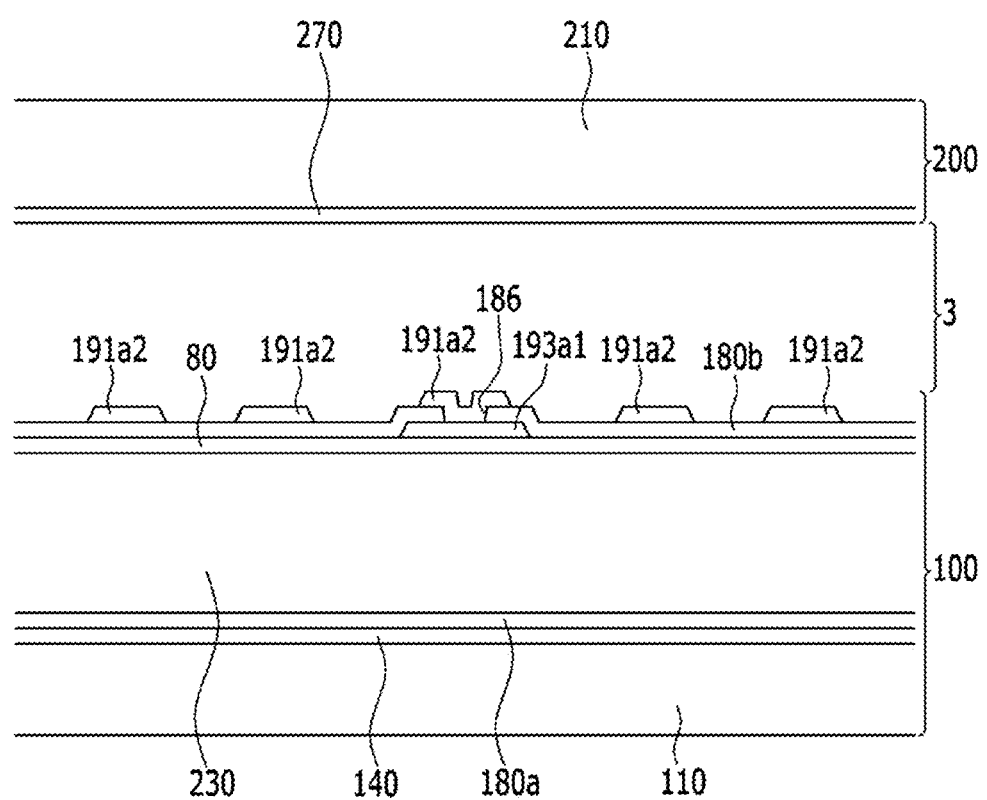
FIG. 7 is a cross-sectional view taken along a line VII-VII of FIG. 1.
Figure 8:
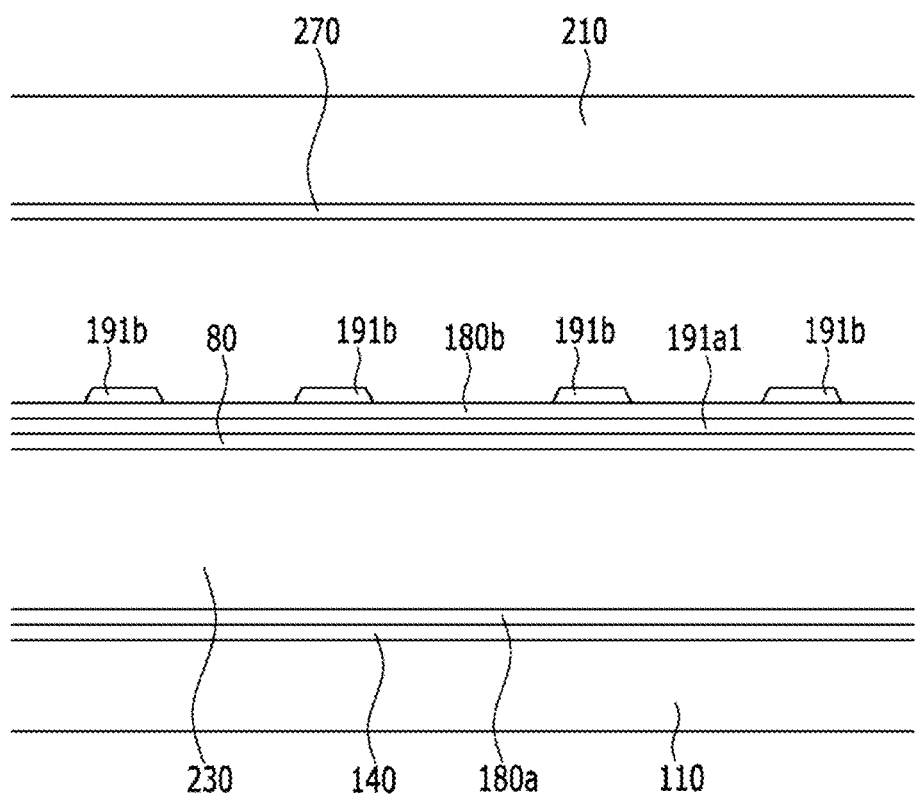
FIG. 8 is a cross-sectional view taken along a line VIII-VIII of FIG. 1.
Figure 9:
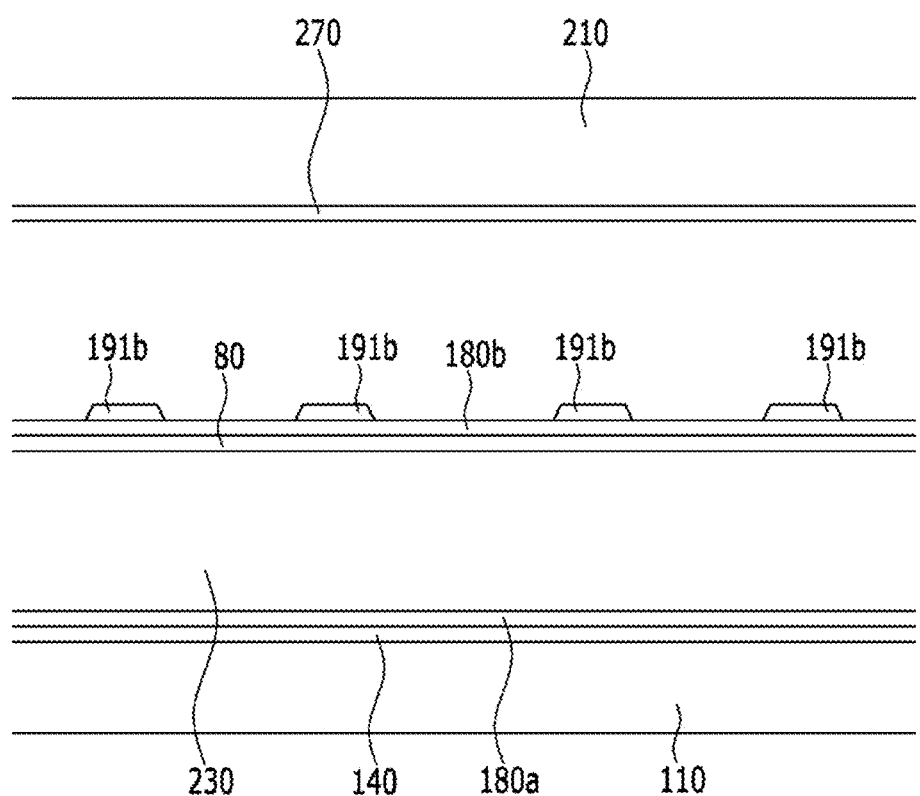
FIG. 9 is a cross-sectional view taken along a line IX-IX of FIG. 1.

FIG. 1 is a layout view of a liquid crystal display according to an exemplary embodiment. FIG. 2 is a cross-sectional view of the liquid crystal display of FIG. 1 taken along a line II-II. FIG. 3 is a partial layout view of a first sub-pixel electrode of the liquid crystal display shown in FIG. 1. FIG. 4 is a layout view of another portion of the first sub-pixel electrode and a second sub-pixel electrode of the liquid crystal display shown in FIG. 1. FIG. 5 is an enlarged layout view of a partial region of FIG. 1. FIG. 6 is a cross-sectional view taken along a line VI-VI of FIG. 1. FIG. 7 is a cross-sectional view taken along a line VII-VII of FIG. 1. FIG. 8 is a cross-sectional view taken along a line VIII-VIII of FIG. 1. FIG. 9 is a cross-sectional view taken along a line IX-IX of FIG. 1.

Referring to FIG. 1 and FIG. 2, the liquid crystal display according to the exemplary embodiment includes a lower panel 100 and an upper panel 200 facing each other, and a liquid crystal layer 3 interposed between the two display panels 100 and 200.

First, the lower panel 100 will be described.

A gate line 121, a reference voltage line 131, and a storage electrode 135 are formed on a first insulating substrate 110 which is made of transparent glass, plastic, or the like. The gate line 121 mainly extends in a horizontal direction and transfers a gate signal.

The gate line 121 includes a first gate electrode 124a, a second gate electrode 124b, a third gate electrode 124c, and a wide end (not illustrated) for connection with another layer or an external driving circuit.

The reference voltage line 131 may extend in parallel with the gate line 121, and has an extension 136 which is connected to a third drain electrode 175c to be described below.

The reference voltage line 131 includes the storage electrode 135 which encloses a pixel area.

A gate insulating layer 140 is formed on the gate line 121, the reference voltage line 131, and the storage electrode 135.

A first semiconductor 154a, a second semiconductor 154b, and a third semiconductor 154c which may be made of amorphous silicon, crystalline silicon, or the like are formed on the gate insulating layer 140.

A plurality of ohmic contacts 163a, 163b, 163c, 165a, and 165b tare formed on the first, second, and third semiconductors 154a, 154b, and 154c. When the semiconductors 154a, 154b, and 154c are oxide semiconductors, the ohmic contacts may be omitted.

Data conductors 171, 173a, 173b, 173c, 175a, 175b, and 175c which include as data line 171 which includes a first source electrode 173a and as second source electrode 173b, a first drain electrode 175a, a second drain electrode 175b, a third source electrode 173c, and the third drain electrode 175c are formed on the ohmic contacts 163a, 163b, 163c, 165a, and 165b, and the gate insulating layer 140.

The second drain electrode 175b is connected to the third source electrode 173c.

The first gate electrode 124a, the first source electrode 173a, and the first drain electrode 175a form a first thin film transistor Qa along with the first semiconductor 154a, and a channel of the first thin film transistor Qa is formed on a portion of the semiconductor 154a between the first source electrode 173a and the first drain electrode 175a. Similarly, the second gate electrode 124b, the second source electrode 173b, and the second drain electrode 175b form a second thin film transistor Qb along with the second semiconductor 154b, and a channel of the second thin film transistor Qb is formed on a portion of the semiconductor 154b between the second source electrode 173b and the second drain electrode 175b. Similarly, the third gate electrode 124c, the third source electrode 173c, and the third drain electrode 175c form a third thin film transistor Qc along with the third semiconductor 154c, and a channel of the third thin film transistor Qc is formed on a portion of the semiconductor 154c between the third source electrode 173c and the third drain electrode 175c.

A first passivation layer 180a which may be made of an insulating material such as a silicon nitride and a silicon oxide is formed on the data conductors 171, 173a, 173b, 173c, 175a, 175b, and 175c and exposed portions of the semiconductors 154a, 154b, and 154c.

A color filter 230 is formed on the first passivation layer 180a.

A light blocking member 220 may be disposed on an area in which the color filter 230 is not disposed and a portion of the color filter 230.

A capping layer 80, sometimes called an overcoat 80, is disposed on the color filter 230. The capping layer 80 prevents the color filter 230 from lifting, and suppresses the liquid crystal layer 3 from being polluted due to an organic material such as a solvent inflowing from the color filter, thereby preventing defects such as an afterimage which may occur at the time of driving the screen from occurring.

A portion of a first sub-pixel electrode 191a is formed on the overcoat 80. A second passivation layer 180b is formed on the overcoat 80 and the portion of the first sub-pixel electrode 191a. Another portion of the first sub-pixel electrode 191a and a second sub-pixel electrode 191b are formed on the second passivation layer 180b. The first sub-pixel electrode 191a and the second sub-pixel electrode 191b form one pixel electrode 191, and the pixel electrode 191 is formed as an approximate quadrangle. The pixel electrode 191 may be made of a transparent metal oxide such as ITO (Indium Tin Oxide) and IZO (Indium Zinc Oxide).

Also, a protrusion electrode 1191 protruded from, also said to protrude from, the pixel electrode 191 is formed.

FIG. 3 shows a plane shape of the portion of the first sub-pixel electrode 191a and the protrusion electrode 1191 positioned under the second passivation layer 180b, and FIG. 4 shows the plane shape of the other portion of the first sub-pixel electrode 191a and the second sub-pixel electrode 191b positioned on the second passivation layer 180b.

The first sub-pixel electrode 191a includes a first sub-region 191a1 and a second sub-region 191a2.

As shown in FIG. 3, the first sub-region 191a1 of the first sub-pixel electrode 191a is positioned under the second passivation layer 180b.

The first sub-region 191a1 of the first sub-pixel electrode 191a is positioned at a center portion of the pixel area and includes a bar electrode part 192a1 extending in the horizontal direction and a plate electrode part 194a1 positioned near the bar electrode part 192a1 and enclosing the bar electrode part 192a1. An extension 193a1 is positioned at the center portion of the bar electrode part 192a1. Also, the first sub-region 191a1 of the first sub-pixel electrode 191 a further includes a protruding part extending upwardly and downwardly from the plate electrode part 194a1. The plate electrode part 194a1 has a planar shape in of a hexagon shape with two triangle shapes cutout in a center of the hexagon shape. The plate means a plate shape which is not split but is formed as a whole plate. In this way, the first sub-region 191a1 of the first sub-pixel electrode 191a is positioned at the center portion of the pixel area.

The protrusion electrode 1191 is protruded from the first sub-region 191a1 of the first sub-pixel electrode 191a. The protrusion electrode 1191 is positioned at both sides of the first sub-region 19a1 of the first sub-pixel electrode 191a. The shape of the protrusion electrode 1191 will be described with reference to FIG. 5 and FIG. 6.

As shown in FIG. 4, the second sub-region 191a2 of the first sub-pixel electrode 191a and the second sub-pixel electrode 191b are positioned on the second passivation layer 180b.

The second sub-region 191a2 of the first sub-pixel electrode 191a is positioned at the center portion of the pixel and the entire shape is a rhombus shape outline with cutout sections. The second sub-region 191a2 of the first sub-pixel electrode 191a includes a cross-shaped stem made of a transverse stem 192a2 and a longitudinal stem 193a2, and a plurality of first branch electrodes 194a2 extending from the cross-shaped stem. The first branch electrodes 194a2 extend in four directions.

The second sub-pixel electrode 191b encloses the second sub-region 191a2 of the first sub-pixel electrode 191a and has the plane shape in which four trapezoid shapes are entirely connected. The second sub-pixel electrode 191b includes an outer electrode 197b positioned at the edge of the pixel electrode 191 and a second branch electrode 194b extending in a different direction from the outer electrode 197b. The outer electrode 197b is formed along the circumference of the pixel electrode 191 and is made as the approximate quadrangle. The second branch electrodes 194b extend in four directions. The second branch electrodes 194b may be formed in the same direction as the first branch electrodes 194a2.

The first sub-region 191a1 of the first sub-pixel electrode 191a overlaps the second sub-pixel electrode 191b. An insulating layer, that is, the second passivation layer 180b, is positioned between the first sub-region 191a1 of the first sub-pixel electrode 191a and the second sub-pixel electrode 191b.

The second sub-region 191a2 of the first sub-pixel electrode 191a is formed with the same layer as the second sub-pixel electrode 191b. The second sub-region 191a2 of the first sub-pixel electrode 191a is electrically separated from the second sub-pixel electrode 191b.

The first passivation layer 180a and the overcoat 80 have a first contact hole 185a extending to and exposing a portion of the first drain electrode 175a. The first passivation layer 180a, the overcoat 80, and second passivation layer 180b have a second contact hole 185b extending to and exposing a portion of the second drain electrode 175b and a third contact hole 185c extending to and exposing a portion of the extension 136 of the reference voltage line 131 and a portion of the third drain electrode 175c.

The first sub-region 191a1 of the first sub-pixel electrode 191a is physically and electrically connected to the first drain electrode 175a through the first contact hole 185a. The first sub-region 191a1 of the first sub-pixel electrode 191a is applied with the first voltage through the first drain electrode 175a. The second sub-pixel electrode 191b is physically and electrically connected to the second drain electrode 175b through the second contact hole 185b. The second sub-pixel electrode 191b is applied with the second voltage through the second drain electrode 175b. In this case, the first sub-pixel electrode 191a and the second sub-pixel electrode 191b are applied with different data voltages.

Also, a connection electrode 195 is formed on the second passivation layer 180b. The connection electrode 195 is electrically separated from the first sub-pixel electrode 191a and the second sub-pixel electrode 191b. The connection electrode 195 overlaps the extension 136 of the reference voltage line 131 and overlaps the third drain electrode 175c.

The connection electrode 195 is physically and electrically connected to the extension 136 of the reference voltage line 131 through the third contact hole 185c, and is physically and electrically connected to the third drain electrode 175c. Accordingly, the third drain electrode 175c is physically and electrically connected to the reference voltage line 131.

The second passivation layer 180b has a fourth contact hole 186 extending to and exposing the extension 193a1 of the first sub-region 191a1 of the first sub-pixel electrode 191a.

The second sub-region 191a2 of the first sub-pixel electrode 191a is connected to the extension 193a1 of the first sub-region 191a1 of the first sub-pixel electrode 191a through the fourth contact hole 186. The second sub-region 191a2 of the first sub-pixel electrode 191a is applied with the first voltage through the first sub-region 191a1 of the first sub-pixel electrode 191a.

Referring to FIG. 1, FIG. 5, and FIG. 6, the protrusion electrode 1191 is protruded from the first sub-region 191a1 of the first sub-pixel electrode 191a. The protrusion electrode 1191 does not overlap the second sub-pixel electrode 191b, but overlaps the data line 171.

The protrusion electrode 1191 is made with a trapezoid shape. In this case, an upper edge and a lower edge with the trapezoid shape are parallel to the data line 171, and an oblique edge extends on the same line as one edge of the first sub-region 191a1 of the first sub-pixel electrode 191a. The lower edge of the trapezoid shape accords with the outer electrode 197b of the second sub-pixel electrode 191b, and a length of the upper edge is smaller than the lower edge.

Next, the upper panel 200 will be described.

The light blocking member 220 and a common electrode 270 are formed on a second insulating substrate 210 made of transparent glass, plastic, or the like.

The light blocking member 220 overlaps the gate line 121, the data line 171, and the first to third thin film transistors Qa, Qb, and Qc. The light blocking member 220 also overlaps the protrusion electrode 1191. Since the protrusion electrode 1191 is electrically connected to the pixel electrode 191, a predetermined voltage is applied to the protrusion electrode 1191 and affects the control of the liquid crystal molecules. However, the protrusion electrode 1191 overlaps the light blocking member 220 such that light passing through the protrusion electrode 1191 is blocked by the light blocking member 220. The light blocking member 220 is referred to as a black matrix and prevents light leakage.

In a case of the liquid crystal display according to another exemplary embodiment, the light blocking member 220 may be positioned on the lower panel 100, and in a case of the liquid crystal display according to a further exemplary embodiment, the color filter 230 may be positioned in the upper panel 200.

The common electrode 270 may be formed on an entire surface of the substrate 210, and the common electrode 270 may be applied with a predetermined voltage.

Alignment layers (not illustrated) are formed on inside surfaces of the display panels 100 and 200, and the alignment layers may be vertical alignment layers.

Polarizers (not illustrated) are located on outer surfaces of the two display panels 100 and 200, transmissive axes of the two polarizers are orthogonal to each other, and one of the transmissive axes is preferably parallel to the gate line 121. However, a polarizer may be arranged at only the outer surface of either one of the two display panels 100 and 200.

The liquid crystal layer 3 has negative dielectric anisotropy, and the liquid crystal molecules of the liquid crystal layer 3 are aligned such that a long axis thereof forms a right angle with respect to the surfaces of the two display panels 100 and 200 in a state where there is no electric field. Accordingly, in a state where there is no electric field, incident light is blocked without passing through a crossed polarizer.

At least one of the liquid crystal layer 3 and the alignment layer may include a photo-reactive material, and in more detail, a reactive mesogen.

Next, a driving method of the liquid crystal display according to the exemplary embodiment will be briefly described.

When the gate line 121 is applied with a gate-on signal, the first gate electrode 124a, the second gate electrode 124b, and the third gate electrode 124c are applied with the gate-on signal, such that the first switching element Qa, the second switching element Qb, and the third switching element Qc are turned on. Therefore, a data voltage applied to the data line 171 is applied to the first subpixel electrode 191a and the second subpixel electrode 191b through the first and second switching elements Qa and Qb which are turned on. In this case, the first subpixel electrode 191a and the second subpixel electrode 191b are applied with a voltage having the same magnitude. However, the voltage applied to the second subpixel electrode 191b is divided by the third switching element Qc which is connected to the second switching element Qb in series. Therefore, the voltage applied to the second subpixel electrode 191b becomes smaller than the voltage applied to the first subpixel electrode 191a.

Again referring to FIG. 1, FIG. 3, and FIG. 4, one pixel area of the liquid crystal display according to the present exemplary embodiment includes a first region R1 in which the second sub-region 191a2 of the first sub-pixel electrode 191a is positioned, a second region R2 in which the first sub-region 191a1 of the first sub-pixel electrode 191a and the second sub-pixel electrode 191b are overlapped, and a third region R3 in which the second sub-pixel electrode 191b that does overlap the first sub-pixel electrode 191a is positioned.

The first to third regions R1, R2, and R3 are respectively divided into four portions according to the direction of the branch electrodes.

Next, the first region R1, the second region R2, and the third region R3 included in one pixel area of the liquid crystal display according to the present exemplary embodiment will be described with reference to FIG. 7 to FIG. 9.

Referring to FIG. 7, in the first region R1 of one pixel area of the liquid crystal display according to the present exemplary embodiment, the electric field is generated between the second sub-region 191a2 of the first sub-pixel electrode 191a positioned at the lower panel 100 and the common electrode 270 positioned at the upper panel 200. The second sub-region 191a2 of the first sub-pixel electrode 191a is connected to the extension 193a1 of the first sub-region 191a1 of the first sub-pixel electrode 191a such that the first voltage is applied thereto and the common electrode 270 is applied with the common voltage. In this case, the second sub-region 191a2 of the first sub-pixel electrode 191a includes the cross-shaped stem 192a2 and 193a2 and the plurality of first branch electrodes 194a2 extending in four directions. The plurality of first branch electrodes 194a2 may be inclined by about 40 degrees to about 45 degrees with reference to the gate line 121. By the fringe field generated by the edge of the plurality of first branch electrodes 194a2, the liquid crystal molecules of the liquid crystal layer 3 corresponding to the first region R1 are inclined in four different directions. In detail, since a horizontal component of the fringe field generated by the plurality of first branch electrodes 194a2 is almost parallel to the edge of the plurality of first branch electrodes 194a2, the liquid crystal molecules are inclined in the direction parallel to the length direction of the plurality of first branch electrodes 194a2.

Referring to FIG. 8, in the second region R2 of one pixel area of the liquid crystal display according to the present exemplary embodiment, the first sub-region 191a1 of the first sub-pixel electrode 191a and the second sub-pixel electrode 191b are overlapped with each other. The liquid crystal molecules of the liquid crystal layer 3 are arranged by the electric field formed between the first sub-region 191a1 of the first sub-pixel electrode 191a positioned between the plurality of second branch electrodes 194b of the second sub-pixel electrode 191b and the common electrode 270, and the electric field formed between the second sub-pixel electrode 191b and the first sub-region 191a1 of the first sub-pixel electrode 191a as well as the electric field formed between the second sub-pixel electrode 191b positioned at the lower panel 100 and the common electrode 270 positioned at the upper panel 200. The second voltage is applied to the second sub-pixel electrode 191b. In this case, the second sub-pixel electrode 191b includes the plurality of second branch electrodes 194b extending in the four directions. The plurality of second branch electrodes 194b may be inclined by about 40 degrees to about 45 degrees with reference to the gate line 121. By the fringe field generated by the edge of the plurality of second branch electrodes 194b, the liquid crystal molecules of the liquid crystal layer 3 corresponding to the second region R2 are inclined in four different directions. In detail, the liquid crystal molecules are inclined in the direction parallel to the length direction of the plurality of second branch electrodes 194b. In this case, the liquid crystal molecules of the liquid crystal layer 3 have an azimuth angle of about 45 degrees.

In the case of the liquid crystal display without the protrusion electrode 1191, the liquid crystal molecules of the liquid crystal layer 3 positioned at the portion in which the first sub-region 191a1 of the first sub-pixel electrode 191a and the outer electrode 197b of the second sub-pixel electrode 191b are overlapped are tilted in the different direction by the horizontal direction electric field (the lateral field), not the azimuth angle of 45 degrees, and accordingly, the transmittance is decreased. Particularly, when one pixel is down-sized to realize the high resolution liquid crystal display, while the length of the second branch electrode 194b is decreased, the deterioration of the control force of the liquid crystal molecules positioned at the edge of the pixel electrode 191 clearly appears.

In the case of the liquid crystal display according to an exemplary embodiment, the protrusion electrode 1191 is formed to be protruded from the first sub-region 191a1 of the first sub-pixel electrode 191a, and the protrusion electrode 1191 is applied with the same voltage as the first sub-pixel electrode 191a. Accordingly, by increasing the magnitude of the electric field affecting the edge of the pixel electrode 191, the control force of the liquid crystal molecules of the liquid crystal layer 3 positioned at the portion in which the first sub-region 191a1 of the first sub-pixel electrode 191a and the outer electrode 197b of the second sub-pixel electrode 191b are overlapped may be improved. Accordingly, the azimuth angle of the liquid crystal molecules of the liquid crystal layer 3 positioned at the edge of the pixel electrode 191 is not tilted and may be arranged close to 45 degrees, thereby improving the transmittance.

Referring to FIG. 9, in the third region R3 of one pixel area of the liquid crystal display according to the present exemplary embodiment, the electric field is generated between the second sub-pixel electrode 191b positioned at the lower panel 100 and the common electrode 270 positioned at the upper panel 200. As described above, the second sub-pixel electrode 191b is applied with the second voltage and the second sub-pixel electrode 191b includes the plurality of second branch electrodes 194b extending in the different four directions, thereby inclining the liquid crystal molecules of the liquid crystal layer 3 positioned at the third region R3 in the four different directions.

As described above, the magnitude of the second voltage applied to the second sob-pixel electrode 191b is smaller than the magnitude of the first voltage applied to the first sub-pixel electrode 191a.

Accordingly, the intensity of the electric field applied to the liquid crystal layer 3 positioned at the first region R1 is largest, and the intensity of the electric field applied to the liquid crystal layer 3 positioned at the third region R3 is smallest. Since the influence of the electric field of the first sub-pixel electrode 191a positioned under the second sub-pixel electrode 191b exists in the second region R2, the intensity of the electric field applied to the liquid crystal layer 3 positioned at the second region R2 is smaller than the electric field applied to the liquid crystal layer 3 positioned at the first region R1 and is larger than the intensity of the electric field applied to the liquid crystal layer 3 positioned at the third region R3.

In this way, in the liquid crystal display according to an exemplary embodiment, one pixel area is divided into the first region in which the first sub-pixel electrode applied with the first voltage that is relatively high is positioned, the second region in which the portion of the first sub-pixel electrode and the portion of the second sub-pixel electrode applied with the second voltage that is relatively low overlap via the insulating layer interposed therebetween, and the third region in which the second sub-pixel electrode applied with the second voltage that is relatively low is positioned. Accordingly, the intensities of the electric fields applied to the liquid crystal molecules corresponding to the first region, the second region, and the third region are differentiated such that the inclination angles of the liquid crystal molecules are differentiated, thereby differentiating the luminance of each region. As described above, if one pixel area is divided into three regions having the different luminances, by smoothly controlling the change of the transmittance according to the gray, the transmittance according to the gray change may be prevented from being sharply changed in the high gray as well as the low gray, thereby correctly expressing the low gray and the high gray while side visibility is close to front visibility.

Next, the transmittance of the liquid crystal display according to an exemplary embodiment will be described with reference to FIG. 10 and FIG. 11. For reference, it will be described compared with the liquid crystal display in which the protrusion electrode is not formed.

Figure 10:
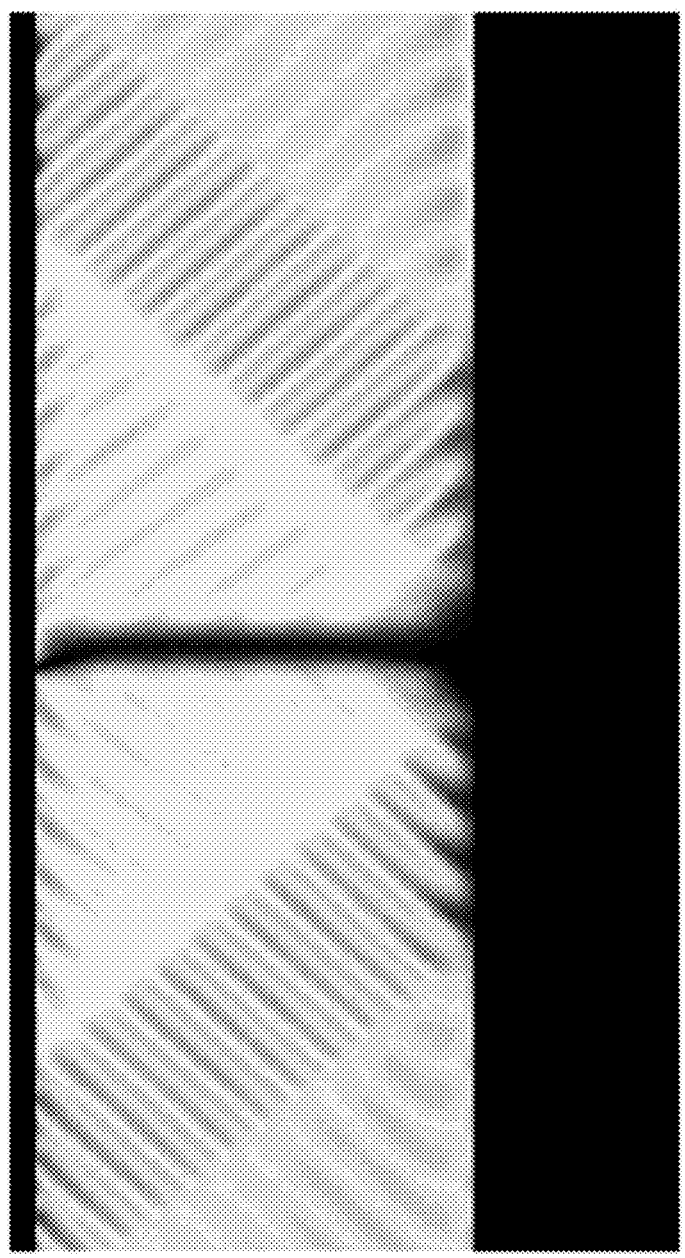
FIG. 10 is a view of a simulation result of a liquid crystal display according to a reference example.
Figure 11:
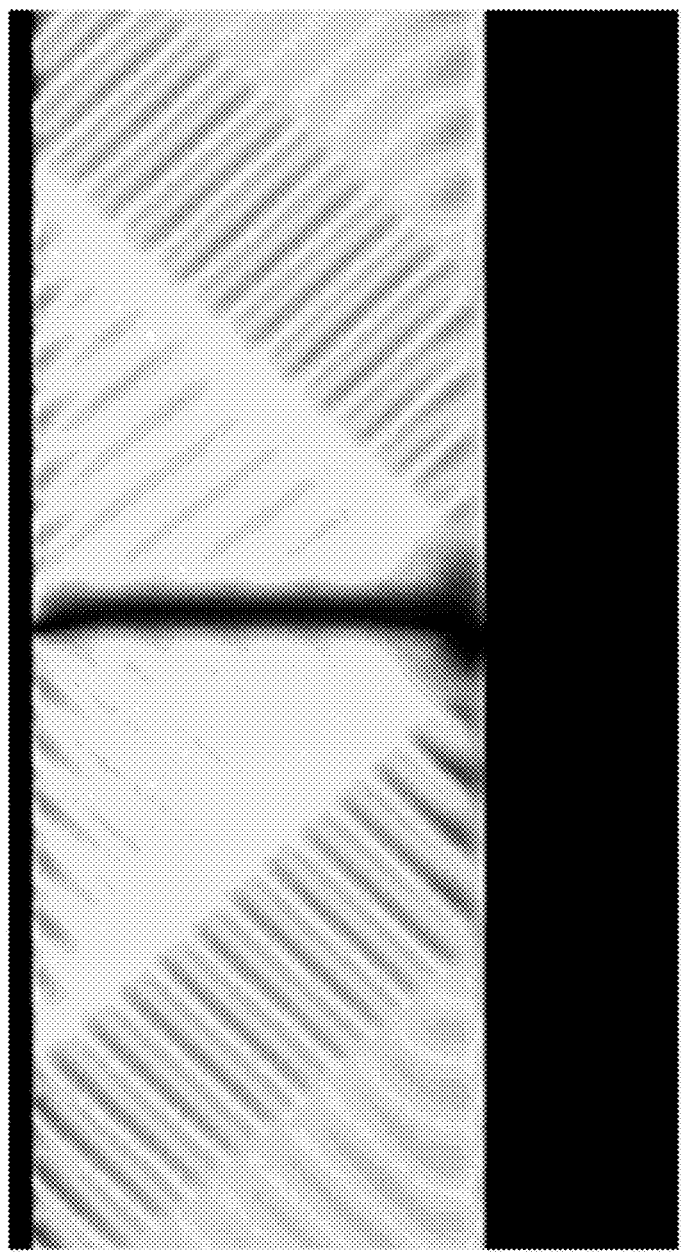
FIG. 11 is a view showing a simulation result of a liquid crystal display according to an exemplary embodiment.

FIG. 10 is a view of a simulation result of a liquid crystal display according to a reference example, and FIG. 11 is a view showing a simulation result of a liquid crystal display according to an exemplary embodiment.

As shown in FIG. 10, in the case of the liquid crystal display according to the reference example, a dark portion is generated in a right edge of the portion in which the first sub-region of the first sub-pixel electrode and the second sub-pixel electrode overlap. This dark portion means that the control of the liquid crystal molecules positioned at the edge of the pixel is abnormal. Accordingly, the liquid crystal display according to the reference example decreases the transmittance by this dark portion.

As shown in FIG. 11, in the case of the liquid crystal display according to an exemplary embodiment, the control of the liquid crystal molecules is normally realized in the edge of the pixel by the protrusion electrode formed to be extended from the first sub-region of the first sub-pixel electrode. Accordingly, it may be confirmed that the dark portion is decreased in the right edge of the portion in which the first sub-region of the first sub-pixel electrode and the second sub-pixel electrode are overlapped. Accordingly, the liquid crystal display according to an exemplary embodiment increases the transmittance compared with the reference example.

Next, the liquid crystal display according to an exemplary embodiment will be described with reference to FIG. 12 and FIG. 13.

Figure 12:
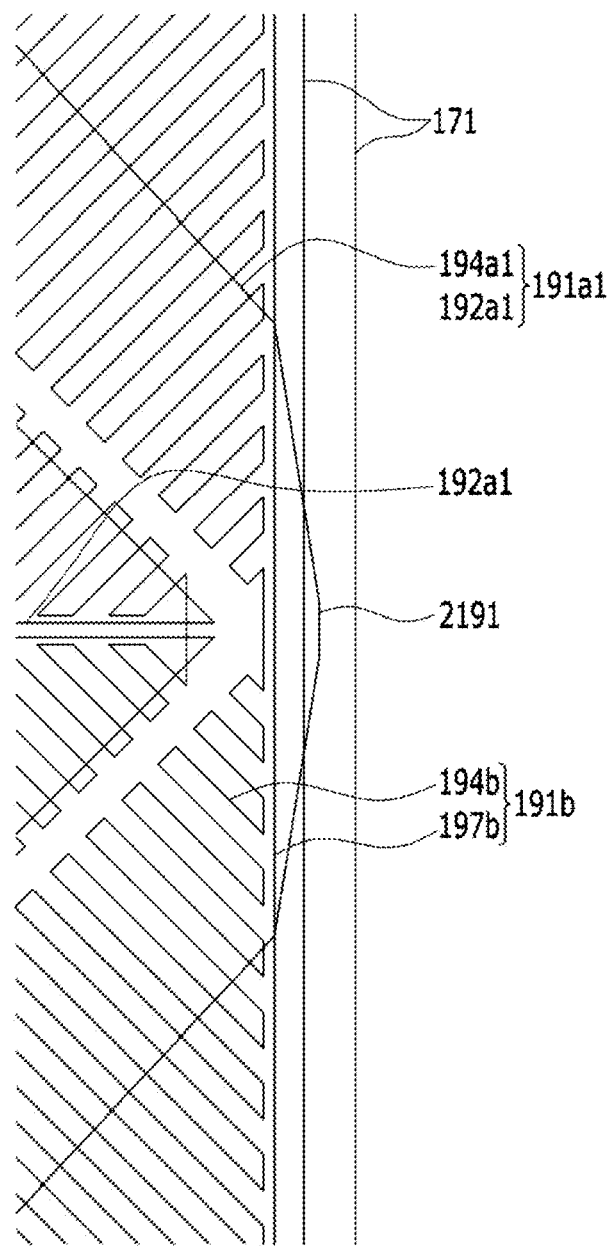
FIG. 12 is an enlarged layout view of a partial region of a liquid crystal display according to an exemplary embodiment.
Figure 13:
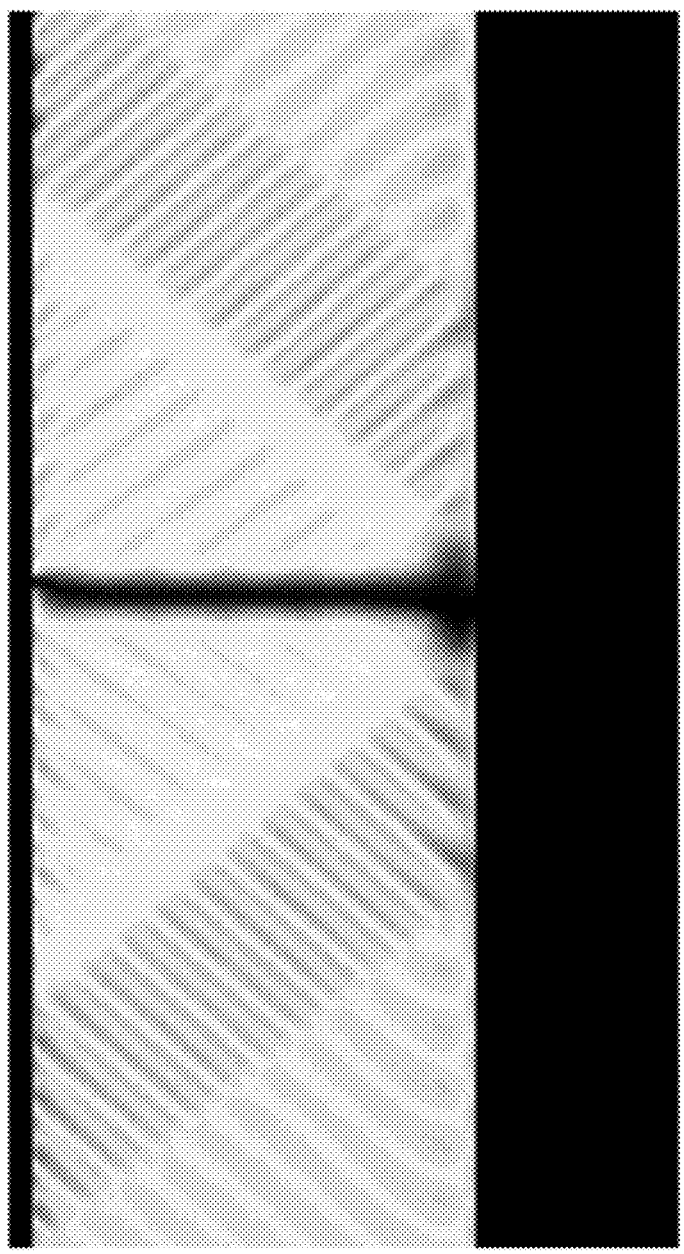
FIG. 13 is a view showing a simulation result of a liquid crystal display according to an exemplary embodiment.

The liquid crystal display according to an exemplary embodiment shown in FIG. 12 and FIG. 13 is almost the same as the liquid crystal display according to an exemplary embodiment shown in FIG. 1 to FIG. 9 such that the repeated description is omitted. In the present exemplary embodiment, the shape of the protrusion electrode is different from the previous exemplary embodiment, and this will be described in detail.

FIG. 12 is an enlarged layout view of a partial region of a liquid crystal display according to an exemplary embodiment, and FIG. 13 is a view showing a simulation result of a liquid crystal display according to an exemplary embodiment.

The liquid crystal display according to an exemplary embodiment includes the lower panel and the upper panel facing each other and the liquid crystal layer interposed between two display panels, like the previous exemplary embodiment. In the lower panel, the pixel electrode 191 including the first sub-pixel electrode 191a and the second sub-pixel electrode 191b is formed and the common electrode is formed in the upper panel. The first sub-pixel electrode 191a includes the first sub-region 191a1 and the second sub-region 191a2, and the first sub-region 191a1 overlaps the second sub-pixel electrode 191b. The second passivation layer 180b is positioned on the first sub-region 191a1 of the first sub-pixel electrode 191a, and the second sub-region 191a2 of the first sub-pixel electrode 191a and the second sub-pixel electrode 191b are positioned on the second passivation layer 180b.

A protrusion electrode 2191 protruded from the pixel electrode 191 is formed, and the protrusion electrode 2191 is protruded from the first sub-region 191a1 of the first sub-pixel electrode 191a. Accordingly, the protrusion electrode 2191 is positioned under the second passivation layer 180b.

The shape of the pixel electrode 191 is the same as the previous exemplary embodiment except for a difference in the plane shape of the protrusion electrode 2191.

In the present exemplary embodiment, the protrusion electrode 2191 is positioned at both sides of the first sub-region 191a1 of the first sub-pixel electrode 191a, and only one side of both sides is shown in FIG. 12. The protrusion electrode 2191 does not overlap the second sub-pixel electrode 191b, but overlaps the data line 171. Also, the light blocking member to overlap the data line 171 is formed and the protrusion electrode 2191 overlaps the light blocking member.

The protrusion electrode 2191 is formed with the trapezoid shape and the length of the upper edge is very short, like a shape similar to a triangle. The upper edge and the lower edge of the trapezoid shape are parallel to the data line 171, and the oblique edge has a sharp inclination. The upper edge has the length similar to the width of the bar electrode part 192a1 of the first sub-region 191a1 of the first sub-pixel electrode 191a or the width of the transverse stem 192a2 of the second sub-region 191a2. The lower edge accords with the outer electrode 197b of the second sub-pixel electrode 191b. In the previous exemplary embodiment, the oblique edge extends on the same line as the one edge of the first sub-region 191a1 of the first sub-pixel electrode 191a, however in the present exemplary embodiment, the oblique edge extends in a shape that is bent from one edge of the first sub-region 191a1 of the first sub-pixel electrode 191a.

In the liquid crystal display according to an exemplary embodiment, the protrusion electrode 2191 is formed to be protruded from the first sub-region 191a1 of the first sub-pixel electrode 191a, and the protrusion electrode 2191 is applied with the same voltage as the first sub-pixel electrode 191a. Accordingly, by increasing the magnitude of the electric field affecting the edge of the pixel electrode 191, the control force of the liquid crystal molecules of the liquid crystal layer 3 positioned at the portion in which the first sub-region 191a1 of the first sub-pixel electrode 191a and the outer electrode 197b of the second sub-pixel electrode 191b may be improved. Accordingly, the azimuth angle of the liquid crystal molecules of the liquid crystal layer 3 positioned at the edge of the pixel electrode 191 is not tilted and may be arranged to be close to 45 degrees, thereby improving the transmittance.

As shown in FIG. 13, in the case of the liquid crystal display according to an exemplary embodiment, e.g., the exemplary embodiment of FIG. 12, the control of the liquid crystal molecules is also normal at the edge of the pixel by the protrusion electrode formed to be extended from the first sub-region of the first sub-pixel electrode. Accordingly, it may be confirmed that the dark portion does not appear at the right edge of the portion in which the first sub-region of the first sub-pixel electrode and the second sub-pixel electrode are overlapped. Accordingly, the liquid crystal display according to an exemplary embodiment has high transmittance compared with the reference example shown in FIG. 10.

Next, the liquid crystal display according to an exemplary embodiment will be described with reference to FIG. 14 to FIG. 16.

Figure 14:
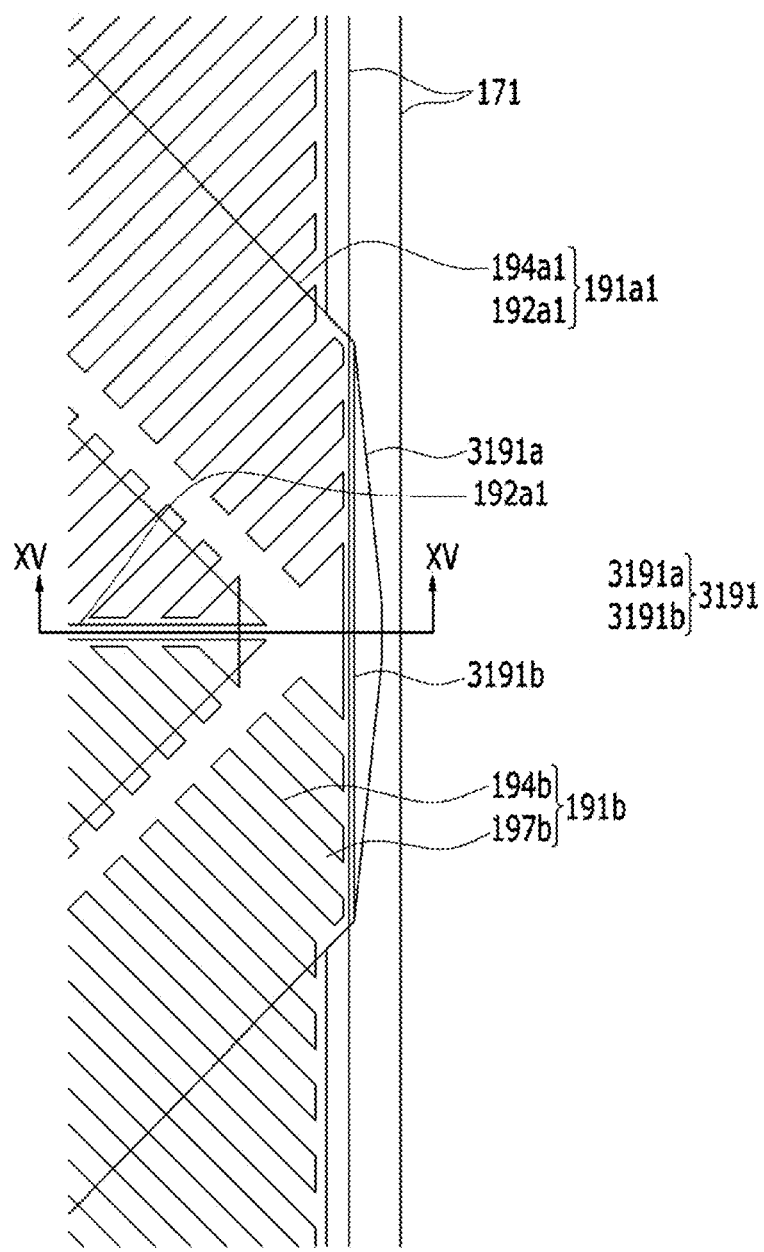
FIG. 14 is an enlarged layout view of a partial region of a liquid crystal display according to an exemplary embodiment.
Figure 15:
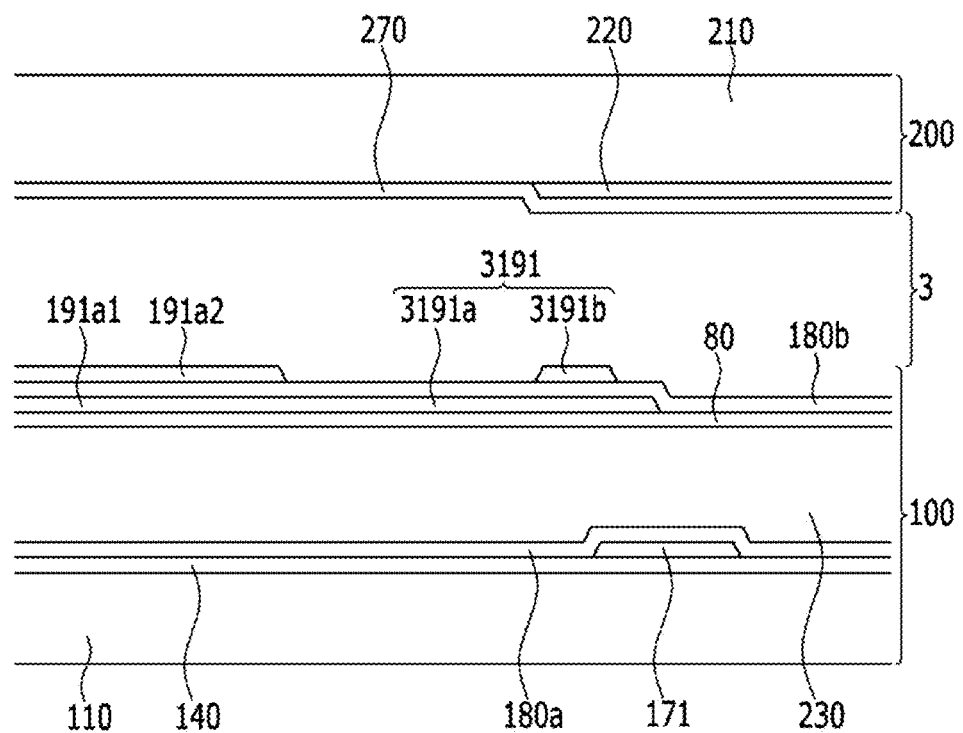
FIG. 15 is a cross-sectional view taken along a line XV-XV of FIG. 14.
Figure 16:
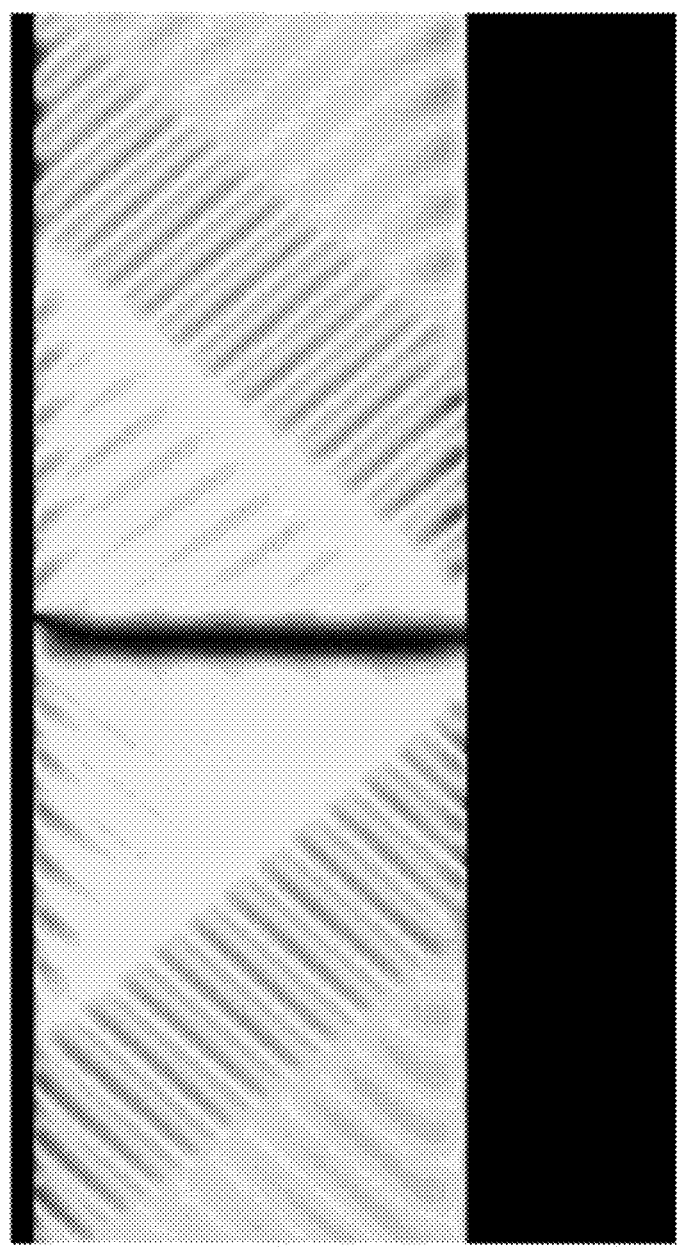
FIG. 16 is a view showing a simulation result of a liquid crystal display according to an exemplary embodiment.

The liquid crystal display according to an exemplary embodiment shown in FIG. 14 to FIG. 16 is almost the same as the liquid crystal display according to an exemplary embodiment shown in FIG. 1 to FIG. 9 such that the repeated description is omitted. The present exemplary embodiment is the same as the previous exemplary embodiment except for the protrusion electrode made of two layers overlapping each other, and it will be described in detail.

FIG. 14 is an enlarged layout view of a partial region of a liquid crystal display according to an exemplary embodiment, FIG. 15 is a cross-sectional view taken along a line XV-XV of FIG. 14, and FIG. 16 is a view showing a simulation result of a liquid crystal display according to an exemplary embodiment.

The liquid crystal display according to an exemplary embodiment includes the lower panel 100 and the upper panel 200 facing each other and the liquid crystal layer 3 interposed between two display panels, like the previous exemplary embodiment. In the lower panel 100, the pixel electrode 191 including the first sub-pixel electrode 191a and the second sub-pixel electrode 191b is formed, and the common electrode 270 is formed in the upper panel 200. The first sub-pixel electrode 191a includes the first sub-region 191a1 and the second sub-region 191a2, and the first sub-region 191a1 overlaps the second sub-pixel electrode 191b. The second passivation layer 180b is positioned on the first sub-region 191a1 of the first sub-pixel electrode 191a, and the second sub-region 191a2 of the first sub-pixel electrode 191a and the second sub-pixel electrode 191b are positioned on the second passivation layer 180b.

A protrusion electrode 3191 protruded from the pixel electrode 191 is formed, and the protrusion electrode 3191 includes a first protrusion electrode 3191a and a second protrusion electrode 3191b. The first protrusion electrode 3191a is protruded from the first sub-region 191a1 of the first sub-pixel electrode 191a and the second protrusion electrode 3191b is protruded from the second sub-pixel electrode 191b. Accordingly, the first protrusion electrode 3191a is positioned under the second passivation layer 180b and the second protrusion electrode 3191b is positioned on the second passivation layer 180b. The first protrusion electrode 3191a and second protrusion electrode 3191b overlap each other via the second passivation layer 180b.

The protrusion electrode 3191 is positioned at both sides of the pixel electrode 191 and only one side of the two sides is shown in FIG. 14. The protrusion electrode 3191 overlaps the data line 171 and the light blocking member 220.

The plane shape of the first protrusion electrode 3191a is formed as a polygon including two edges parallel to the data line 171 and the edge extending in the same line as one edge of the first sub-region 191a1 of the first sub-pixel electrode 191a. One edge of two edges parallel to the data line 171 accords with the outer electrode 197b of the second sub-pixel electrode 191b, and the other edge has the length similar to the width of the bar electrode part 192a1 of the first sub-region 191a1 of the first sub-pixel electrode 191a or the width of the transverse stem 192a2 of the second sub-region 191a2.

The plane shape of the second protrusion electrode 3191b is formed with a shape extending on the same line as the second branch electrodes 194b of the second sub-pixel electrode 191b and having the edges of which are connected.

In the liquid crystal display according to an exemplary embodiment, the protrusion electrode 3191 is formed to protrude from the first sub-region 191a1 of the first sub-pixel electrode 191a and the second sub-pixel electrode 191b. The first protrusion electrode 3191a is applied with the same voltage as the first sub-pixel electrode 191a and the second protrusion electrode 3191b is applied with the same voltage as the second sub-pixel electrode 191b. Accordingly, by increasing the magnitude of the electric field affecting the edge of the pixel electrode 191, the control force of the liquid crystal molecules of the liquid crystal layer 3 positioned at the edge of the pixel electrode 191 may be improved. Accordingly, the azimuth angle of the liquid crystal molecules of the liquid crystal layer 3 positioned at the edge of the pixel electrode 191 is not tilted and may be arranged to be close to 45 degrees, thereby improving the transmittance.

As shown in FIG. 16, in the case of the liquid crystal display according to an exemplary embodiment, e.g., the exemplary embodiment of FIGS. 14 and 15, the control of the liquid crystal molecules is also normal at the edge of the pixel by the protrusion electrode formed to be extended from the pixel electrode. Accordingly, it may be confirmed that the dark portion does not appear at the right edge of the portion in which the first sub-region of the first sub-pixel electrode and the second sub-pixel electrode are overlapped. Accordingly, the liquid crystal display according to an exemplary embodiment has high transmittance compared with the reference example shown in FIG. 10.

Next, the liquid crystal display according to an exemplary embodiment will be described with reference to FIG. 17 and FIG. 18.

Figure 17:
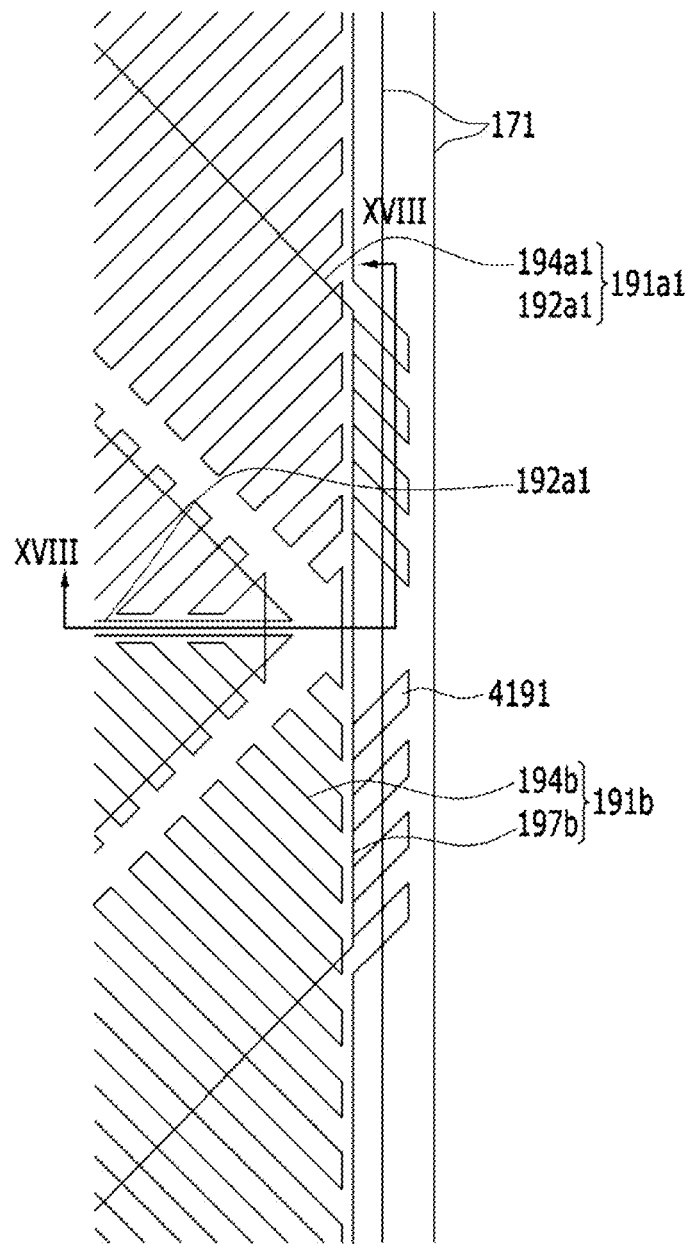
FIG. 17 is an enlarged layout view of a partial region of a liquid crystal display according to an exemplary embodiment.
Figure 18:
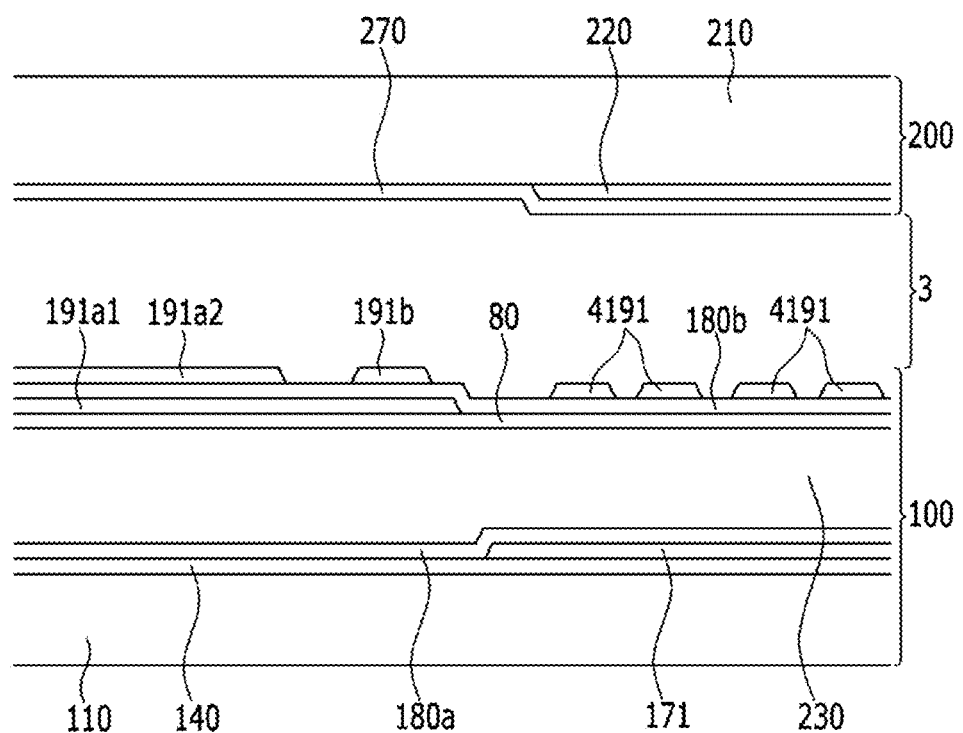
FIG. 18 is a cross-sectional view taken along a line XVIII-XVIII of FIG. 17.

The liquid crystal display according to an exemplary embodiment shown in FIG. 17 and FIG. 18 is almost the same as the liquid crystal display according to an exemplary embodiment shown in FIG. 1 to FIG. 9 such that the repeated description is omitted. The present exemplary embodiment is the same as the previous exemplary embodiment except for the protrusion electrode protruded from the second sub-pixel electrode, and it will be described.

FIG. 17 is an enlarged layout view of a partial region of a liquid crystal display according to an exemplary embodiment, and FIG. 18 is a cross-sectional view taken along a line XVIII-XVIII of FIG. 17.

The liquid crystal display according to an exemplary embodiment includes the lower panel 100 and the upper panel 200 facing each other and the liquid crystal layer 3 interposed between the two display panels, like the previous exemplary embodiment. In the lower panel 100, the pixel electrode 191 including the first sub-pixel electrode 191a and the second sub-pixel electrode 191b is formed, and the common electrode 270 is formed in the upper panel 200. The first sub-pixel electrode 191a includes the first sub-region 191a1 and the second sub-region 191a2, and the first sub-region 191a1 overlaps the second sub-pixel electrode 191b. The second passivation layer 180b is positioned on the first sub-region 191a1 of the first sub-pixel electrode 191a, and the second sub-region 191a2 of the first sub-pixel electrode 191a and the second sub-pixel electrode 191b are positioned on the second passivation layer 180b.

A protrusion electrode 4191 protruded from the pixel electrode 191 is formed, and the protrusion electrode 4191 is protruded from the second sub-pixel electrode 191*b*. Accordingly, the protrusion electrode 4191 is positioned on the second passivation layer 180*b*.

The protrusion electrode 4191 is positioned at both sides of the pixel electrode 191, and only one side of the two sides is shown in FIG. 17. The protrusion electrode 4191 overlaps the data line 171 and the light blocking member 220.

The plane shape of the protrusion electrode 4191 is made of a plurality of branch electrodes having a predetermined interval. In this case, the protrusion electrode 4191 is symmetrical to slits positioned between the second branch electrodes 194*b* of the second sub-pixel electrode 191*b*. That is, the second branch electrode 194*b* and the protrusion electrode 4191 are alternately disposed at the right and left with reference to the outer electrode 197*b* of the second sub-pixel electrode 191*b*.

In the liquid crystal display according to an exemplary embodiment, the protrusion electrode 4191 is formed to be protruded from the second sub-pixel electrode 191*b*, and the protrusion electrode 4191 is applied with the same voltage as the second sub-pixel electrode 191*b*. Accordingly, by increasing the magnitude of the electric field affecting the edge of the pixel electrode 191, the control force of the liquid crystal molecules of the liquid crystal layer 3 positioned at the edge of the pixel electrode 191 may be improved. Accordingly, the azimuth angle of the liquid crystal molecules of the liquid crystal layer 3 positioned at the edge of the pixel electrode 191 is not tilted and may be arranged to be close to 45 degrees, thereby improving the transmittance.

Next, the liquid crystal display according to an exemplary embodiment will be described with reference to FIG. 19 and FIG. 20.

Figure 19:
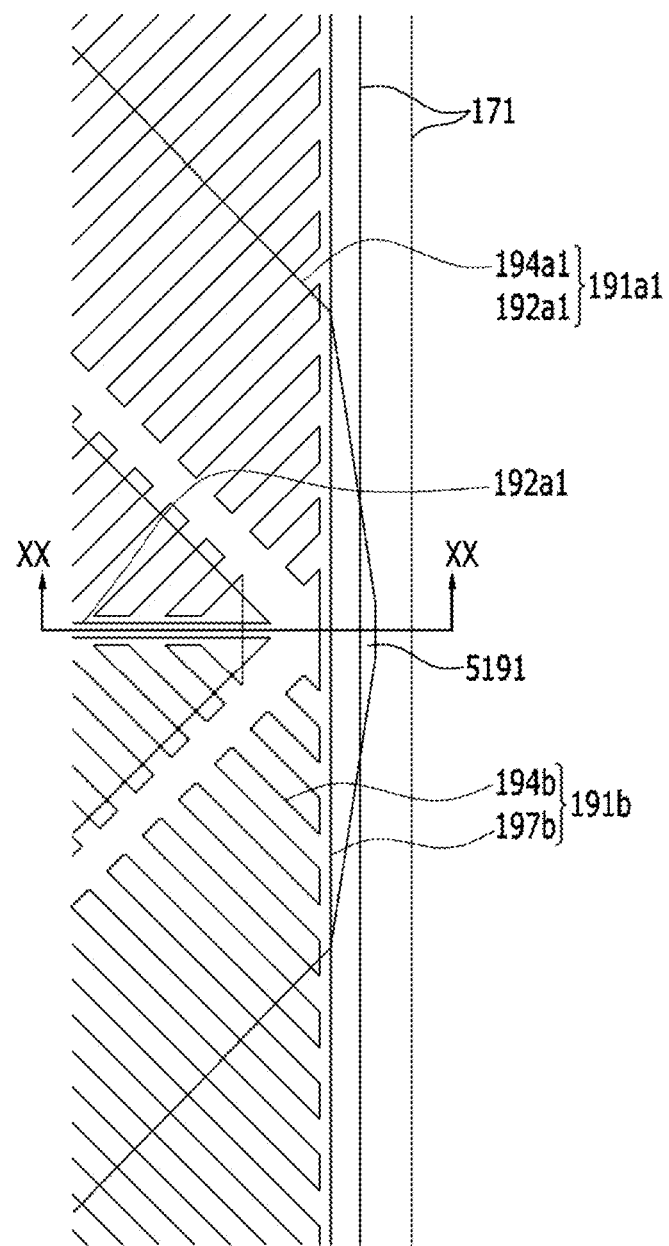
FIG. 19 is an enlarged layout view of a partial region of a liquid crystal display according to an exemplary embodiment.
Figure 20:
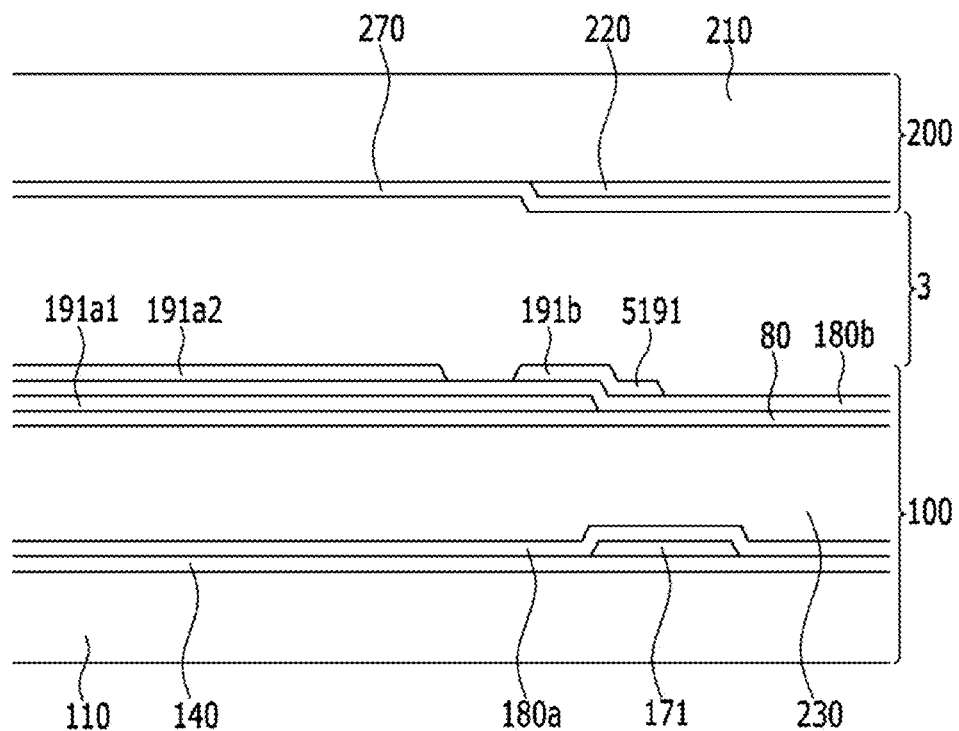
FIG. 20 is a cross-sectional view taken along a line XX-XX of FIG. 19.

The liquid crystal display according to an exemplary embodiment shown in FIG. 19 and FIG. 20 is almost the same as the liquid crystal display according to an exemplary embodiment shown in FIG. 1 to FIG. 9 such that the repeated description is omitted. The present exemplary embodiment is the same as the previous exemplary embodiment except for the protrusion electrode protruded from the second sub-pixel electrode, and it will be described.

FIG. 19 is an enlarged layout view of a partial region of a liquid crystal display according to an exemplary embodiment, and FIG. 20 is a cross-sectional view taken along a line XX-XX of FIG. 19.

The liquid crystal display according to an exemplary embodiment includes the lower panel 100 and the upper panel 200 facing each other and the liquid crystal layer 3 interposed between the two display panels, like the previous exemplary embodiment. In the lower panel 100, the pixel electrode 191 including the first sub-pixel electrode 191*a* and the second sub-pixel electrode 191*b* is formed, and the common electrode 270 is formed in the upper panel 200. The first sub-pixel electrode 191*a* includes the first sub-region 191*a*1 and the second sub-region 191*a*2, and the first sub-region 191*a*1 overlaps the second sub-pixel electrode 191*b*. The second passivation layer 180*b* is positioned on the first sub-region 191*a*1 of the first sub-pixel electrode 191*a*, and the second sub-region 191*a*2 of the first sub-pixel electrode 191*a* and the second sub-pixel electrode 191*b* are positioned on the second passivation layer 180*b*.

A protrusion electrode 5191 protruded from the pixel electrode 191 is formed, and the protrusion electrode 5191 is protruded from the second sub-pixel electrode 191*b*. Accordingly, the protrusion electrode 5191 is positioned on the second passivation layer 180*b*.

The protrusion electrode 5191 is positioned at both sides of the pixel electrode 191, and only one side of the two sides is shown in FIG. 19. The protrusion electrode 5191 overlaps the data line 171 and the light blocking member 220.

The protrusion electrode 5191 is formed with the trapezoid shape and the length of the upper edge is very short, thereby forming a shape similar to a triangle. The upper edge and the lower edge of the trapezoid shape are parallel to the data line 171, and the oblique edge has the sharp inclination. The upper edge has a length that is similar to the width of the bar electrode part 192*a*1 of the first sub-region 191*a*1 of the first sub-pixel electrode 191*a* or the width of the transverse stem 192*a*2 of the second sub-region 191*a*2. The lower edge accords with the outer electrode 197*b* of the second sub-pixel electrode 191*b*. The oblique edge has a sharper inclination than one side of the first sub-region 191*a*1 of the first sub-pixel electrode 191*a*.

In the liquid crystal display according to an exemplary embodiment, the protrusion electrode 5191 is formed to be protruded from the second sub-pixel electrode 191*b*, and the protrusion electrode 5191 is applied with the same voltage as the second sub-pixel electrode 191*b*. Accordingly, by increasing the magnitude of the electric field affecting the edge of the pixel electrode 191, the control force of the liquid crystal molecules of the liquid crystal layer 3 positioned at the edge of the pixel electrode 191 may be improved. Accordingly, the azimuth angle of the liquid crystal molecules of the liquid crystal layer 3 positioned at the edge of the pixel electrode 191 is not tilted and may be arranged to be close to 45 degrees, thereby improving the transmittance.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

| <Description of symbols> | |
| --- | --- |
| 3: liquid crystal layer | 100: lower panel |
| 121: gate line | 131: reference voltage line |
| 171: data line | 180a: first passivation layer |
| 180b: second passivation layer | 191: pixel electrode |
| 191a: first sub-pixel electrode | |
| 191a1: first sub-region | |
| 191a2: second sub-region | |
| 191b: second sub-pixel electrode | |
| 192a1: bar electrode part | |
| 192a2: transverse stem | |
| 193a1: extension | |
| 193a2: longitudinal stem | |
| 194a1: plate electrode part | |
| 194a2: first branch electrode | |
| 194b: second branch electrode | |
| 197b: outer electrode | |
| 200: upper panel | |
| 1191, 2191, 3191, 4191, | |
| 5191: protrusion electrode | |
| 3191a: first protrusion electrode | 3191b: second protrusion electrode |

What is claimed is:

1. A liquid crystal display comprising: a first substrate; a gate line and a data line disposed on the first substrate; a thin film transistor connected to the gate line and the data line; a pixel electrode positioned on the first substrate and connected to the thin film transistor, the pixel electrode including a first sub-pixel electrode including a first sub-region configured to be applied with a first voltage and a second sub-region configured to be applied with the first voltage, the pixel electrode further including a second sub-pixel electrode configured to be applied with a second voltage; a protrusion electrode protruding from the pixel electrode to overlap the data line; an insulating layer positioned on the first sub-region of the first sub-pixel electrode and positioned under the second sub-pixel electrode and the second sub-region of the first sub-pixel electrode; a second substrate facing the first substrate; a common electrode positioned on the second substrate and configured to be applied with a common voltage; and a liquid crystal layer positioned between first substrate and the second substrate, wherein, in a cross-sectional view, the first sub-region of the first sub-pixel electrode overlaps the second sub pixel electrode and at least a portion of the second sub-region of the first sub-pixel electrode, wherein the second sub-pixel electrode and the second sub-region of the first sub-pixel electrode are disposed in a same layer, wherein the second sub-pixel electrode is separated from the second sub-region of the first sub-pixel electrode, wherein the first voltage is different from the second voltage.

2. The liquid crystal display of claim 1, wherein a difference between the first voltage and the common voltage is larger than a difference between the second voltage and the common voltage.

3. The liquid crystal display of claim 1, wherein the protrusion electrode protrudes from the first sub-region of the first sub-pixel electrode.

4. The liquid crystal display of claim 1, wherein the protrusion electrode is formed with a trapezoid shape.

5. The liquid crystal display of claim 1, wherein the protrusion electrode includes a first protrusion electrode protruding from the first sub-region of the first sub-pixel electrode and a second protrusion electrode protruding from the second sub-pixel electrode.

6. The liquid crystal display of claim 1, wherein the protrusion electrode protrudes from the second sub-pixel electrode.

7. The liquid crystal display of claim 1, further comprising a light blocking member overlapping the gate line, the data line, and the protrusion electrode.

8. The liquid crystal display of claim 7, wherein the light blocking member is disposed on the first substrate or the second substrate.

9. The liquid crystal display of claim 1, wherein the pixel electrode is formed as a quadrangle, the second sub-region of the first sub-pixel electrode is positioned at a center of the pixel electrode and has a rhombus shape outline with cutout sections, the first sub-region of the first sub-pixel electrode includes a plate electrode part of a hexagon shape with two triangle shapes cutout in a center of the hexagon shape enclosing the second sub-region and a bar electrode part overlapping the second sub-region and connected to the plate electrode part, and the second sub-pixel electrode is entirely formed of four trapezoid shapes enclosing the second sub-region of the first sub-pixel electrode.

10. The liquid crystal display of claim 9, wherein the protrusion electrode protrudes from the first sub-region of the first sub-pixel electrode.

11. The liquid crystal display of claim 10, wherein the protrusion electrode is formed with a trapezoid shape having an upper edge and a lower edge parallel to the data line and an oblique edge extending on a same line as one edge of the first sub-region of the first sub-pixel electrode.

12. The liquid crystal display of claim 10, wherein the protrusion electrode is formed with a trapezoid shape having an upper edge and a lower edge parallel to the data line and an oblique edge extending to be inclined from one edge of the first sub-region of the first sub-pixel electrode.

13. The liquid crystal display of claim 12, wherein a length of the upper edge is the same as the width of the bar electrode part.

14. The liquid crystal display of claim 9, wherein the protrusion electrode includes a first protrusion electrode protruding from the first sub-region of the first sub-pixel electrode and a second protrusion electrode protruding from the second sub-pixel electrode.

15. The liquid crystal display of claim 14, wherein the first protrusion electrode and the second protrusion electrode overlap each other.

16. The liquid crystal display of claim 15, wherein the first protrusion electrode is formed of a polygon including two edges parallel to the data line and an edge extending on a same line as one edge of the first sub-region of the first sub-pixel electrode.

17. The liquid crystal display of claim 16, wherein the second sub-pixel electrode includes an outer electrode positioned at an edge of the pixel electrode and branch electrodes extending in different directions from the outer electrode, and the second protrusion electrode extends on a same line as the branch electrodes.

18. The liquid crystal display of claim 9, wherein the protrusion electrode protrudes from the second sub-pixel electrode.

19. The liquid crystal display of claim 18, wherein the second sub-pixel electrode includes an outer electrode positioned at an edge of the pixel electrode and branch electrodes extending in the different directions from the outer electrode, and the protrusion electrode is symmetrical to a slit positioned between the branch electrodes.

20. The liquid crystal display of claim 18, wherein the protrusion electrode is formed with a trapezoid shape including an upper edge and a lower edge parallel to the data line and an oblique edge extending on a same line as one edge of the first sub-region of the first sub-pixel electrode.

* * * * *